United States Patent
Park

(10) Patent No.: US 9,329,520 B2
(45) Date of Patent: May 3, 2016

(54) MULTIBEAM LIGHT SOURCE UNIT, METHOD OF ADJUSTING THE SAME, LIGHT SCANNING UNIT, AND ELECTROPHOTOGRAPHY TYPE IMAGE FORMING APPARATUS

(71) Applicant: Samsung Electronics Co., Ltd., Suwon-si, Gyeonggi-do (KR)

(72) Inventor: Ju-hong Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/340,980

(22) Filed: Jul. 25, 2014

(65) Prior Publication Data

US 2015/0138297 A1    May 21, 2015

(30) Foreign Application Priority Data

Nov. 21, 2013    (KR) .................. 10-2013-0142375

(51) Int. Cl.
| | |
|---|---|
| *B41J 2/435* | (2006.01) |
| *B41J 27/00* | (2006.01) |
| *G03G 15/04* | (2006.01) |
| *F21V 14/02* | (2006.01) |
| *F21V 19/02* | (2006.01) |
| *G02B 26/08* | (2006.01) |
| *B41J 2/47* | (2006.01) |

(52) U.S. Cl.
CPC ................. *G03G 15/04* (2013.01); *B41J 2/473* (2013.01); *F21V 14/02* (2013.01); *F21V 19/02* (2013.01); *G02B 26/0833* (2013.01); *Y10T 29/49004* (2015.01)

(58) Field of Classification Search
CPC ..... G03G 15/04; G02B 26/0833; B41J 2/473; B41J 2/47

USPC ......... 347/230, 238, 241, 242, 245, 256, 257, 347/263

See application file for complete search history.

(56) References Cited

U.S. PATENT DOCUMENTS

| | | | |
|---|---|---|---|
| 7,508,859 B2 * | 3/2009 | Azami et al. .................. | 372/101 |
| 7,792,008 B2 * | 9/2010 | Nishidate et al. ............. | 369/121 |
| 2008/0063023 A1 | 3/2008 | Azami et al. | |
| 2013/0070042 A1 | 3/2013 | Yamakawa et al. | |

FOREIGN PATENT DOCUMENTS

| | | | |
|---|---|---|---|
| EP | 2 447 756 A1 | 5/2012 | |
| JP | 11-242170 | 9/1999 | |
| JP | 2010214605 A * | 9/2010 | ................ B41J 2/44 |
| JP | 2012-159845 | 8/2012 | |
| WO | WO 2013/133242 A1 | 9/2013 | |

OTHER PUBLICATIONS

Extended European Search Report dated Mar. 15, 2015 in corresponding European Application No. 141890970.0.

* cited by examiner

*Primary Examiner* — Hai C Pham

(74) *Attorney, Agent, or Firm* — Staas & Halsey LLP

(57) ABSTRACT

A multibeam light source unit, a method of adjusting the same, a light scanning unit, and an image forming apparatus are provided. The multibeam light source unit includes light sources that emit multiple beams, a flange that includes installation surface on which holder installation holes are provided, and middle holders on which a light source is installed. The middle holder includes a light source mounting unit, a cylinder-shape insertion unit that is inserted into a holder installation hole, and fixing protrusion units protruding outside from a light source mounting unit and fixed to the flange, and a jig coupling unit that is coupled with a jig when adjustment is performed.

26 Claims, 21 Drawing Sheets

MULTIBEAM LIGHT SOURCE UNIT, METHOD OF ADJUSTING THE SAME, LIGHT SCANNING UNIT, AND ELECTROPHOTOGRAPHY TYPE IMAGE FORMING APPARATUS

CROSS-REFERENCE TO RELATED APPLICATIONS

This application is related to, and claims the priority benefit of, Korean Patent Application No. 10-2013-0142375 filed on Nov. 21, 2013, in the Korean Intellectual Property Office, the disclosure of which is incorporated herein in its entirety by reference.

BACKGROUND

1. Field

One or more embodiments relate to a multibeam light source unit, a method of adjusting the unit, a light scanning unit, and an electrophotography type image forming apparatus, and more particularly, to a multibeam light source unit in which adjustment of light sources is easy in an assembly process, a method of adjusting the unit, a light scanning unit, and an electrophotography type image forming apparatus.

2. Description of the Related Art

An electrophotography type image forming apparatus, such as a laser printer, a digital copying machine, and a multifunction printer (MFP), has a structure in which by emitting a light beam to a photoreceptor through a light scanning device, an electrostatic latent image is formed, the formed electrostatic latent image is developed to a development image by using a developer such as a toner, and the development image is transferred on a printing medium.

In an image forming apparatus, a multibeam light scanning unit, which records a plurality of lines by using a plurality of light beams, may be used in order to improve the printing speed. A multibeam light scanning unit uses a light source, which emits at least two light beams (hereinafter, referred to as a multibeam), such as a multibeam laser diode. For the image forming apparatus to implement a color image, the light scanning unit has a plurality of light sources to be modulated by an image signal corresponding to image information of a plurality of single colors, for example, black (K), magenta (M), yellow (Y), cyan (C).

In a multibeam light scanning unit, adjustment of interval between beams of a multibeam may be performed by rotating light sources. For example, as illustrated in FIG. 1, a multibeam light scanning unit includes a light source 1 fixed to an optical housing 8 by using a light source holder 5. The light source holder 5 may be coupled with the optical housing 8 by using screws. Adjustment of intervals between beams of the light source 1 may be performed by pressing the light source 1 into the light source holder 5 and grabbing and turning a grip unit 5A of the light source holder 5. As an example, as illustrated in FIG. 2, an optical scanning unit has a structure in which an LD unit 40 is formed by pressing two laser diodes 54 and 55 into a holder 55 with a leaf spring 65 pressing the LD unit 40 into an installation hole of an optical housing 60. Adjustment of rotation of the LD unit 40 is performed by turning an adjustment screw 71 of an adjustment device maintenance unit 58.

In the rotation adjustment structure of the conventional multibeam light scanning unit, there are problems of deformation in a fixing process after adjusting a light source, and vulnerability to external environment changes. For example, in a structure in which a light source holder is fixed to an optical housing by a coupling unit, such as screws, even though a grip unit of the light source holder is fixed, the optical housing and the light source holder may be deformed by variation in the coupling power of the screws, the order of coupling the screws, and changes in the coupling torque. In a structure in which a light source holder is equipped with an elastic unit, such as a leaf spring, variation in the spring tension occurs because of the simple fixing by the spring tension, and a gap as big as the allowance between the optical housing and the light source holder occurs. This structure is vulnerable to external shock. Also, when the internal and external temperatures of the multibeam light scanning unit increases, it is highly likely that a deformation occurs because of the asymmetrical shape of the light source holder. Because of these problems, the position of a beam emitted from a light source changes and the position on the surface of a photoreceptor becomes incorrect.

When an existing single light beam is used, the sensitivity of the rotational angle of a light source may not matter. However, when a multibeam, formed with two or more light beams is used, the sensitivity of the rotational angle of a light source increases. For example, in order to maintain an existing performance, the angle tolerance of a light source using two beams may be, for example, approximately 14 degrees. However, when a light source using four beams is used, the angle tolerance may be, for example, within 1.5 degrees and thus the sensitivity increases, for example, by 9.3 times or more. In an image forming apparatus using one beam, deterioration in the picture quality due to this problem may be small, but in a color image forming apparatus using a plurality of light sources with a plurality of photoreceptors, this causes incorrect image colors and thus degrades the quality of an image.

A light scanning unit using a tilted incident beam may reduce the size and material cost of a light scanning unit having a plurality of mounted light sources because it has compact light path layout and smaller number of parts. In a light scanning unit using a tilted incident beam, a plurality of light sources may be disposed with narrow intervals. However, it is not easy to mount a plurality of light sources with narrow intervals because of issues of size, shape, and fixing method of light source holders that are used in the conventional assembly of light sources.

SUMMARY

One or more embodiments include a multibeam light source unit in which adjustment of light sources is easily performed and that has a compact structure, a method of adjusting the multibeam light source unit, a light scanning unit, and an electrophotography type image forming apparatus.

Additional aspects will be set forth in part in the description that follows and, in part, will be apparent from the description, or may be learned by practice of the presented embodiments.

According to one or more embodiments, a multibeam light source unit includes a plurality of light sources that emit multibeam, respectively, a flange that has an installation surface on which a plurality of holder installation holes are provided, and a plurality of middle holders on each of which a corresponding one of the plurality of light sources is provided, wherein each of the plurality of the middle holders includes a light source mounting unit on which one of the plurality of the light sources is provided, a cylinder-shape insertion unit that is inserted into one of the plurality of the holder installation holes, a first fixing protrusion unit and a second fixing protrusion unit, each of which is protruding outside from the light source mounting unit and is fixed to the flange by adhesive; and a jig coupling unit that is coupled with a jig when adjustment is performed.

In the multibeam light source unit, the plurality of holder installation holes may be disposed in rows and columns in a main scanning direction and in a sub scanning direction, respectively.

For example, the plurality of holder installation holes may be four holder installation holes, and the four holder installation holes may be disposed in two rows and two columns in a main scanning direction and in a sub scanning direction, respectively.

The plurality of holder installation holes may be two holder installation holes and the two holder installation holes may be disposed with an interval in a sub scanning direction.

In the multibeam light source unit, the flange may include a first fixing groove unit and a second fixing groove unit concavely formed in the vicinity of each of the plurality of holder installation holes.

The first and second fixing groove units may be formed by being extended in an arc shape centering around a corresponding one of the plurality of holder installation holes.

The first and second fixing groove units may be formed at positions to be in contact with a first fixing protrusion unit and a second fixing protrusion unit, respectively, of the plurality of the middle holders.

The plurality of holder installation holes and the first and second fixing groove units may be formed in bilateral symmetry or rotational symmetry on the installation surface of the flange.

The flange may be formed of plastic resin.

The light source mounting unit may include a penetration hole into which the light source is pressed in, and the penetration hole may penetrate to the end of the insertion unit.

The outer circumference surface of the light source mounting unit may be formed in a canted column shape, and the canted column shape of the light source mounting unit may perform as a jig coupling unit.

The first and second fixing protrusion units may be disposed in bilateral symmetry or rotational symmetry with respect to the light source mounting unit.

In each of the first and second fixing protrusion units, part of the end may be removed or a penetration hole may be formed at the end.

The plurality of middle holders may be fixed to the flange with photopolymer adhesive.

Each of the first and second jig coupling units may have a protrusion shape protruding from circumference of the light source mounting unit.

Each of the first and second jig coupling units may have a concave groove shape concavely formed in circumference of the light source mounting unit.

The first and second jig coupling units may be disposed in bilateral symmetry or rotational symmetry with respect to the light source mounting unit.

The first and second jig coupling units may have shapes different from each other.

The plurality of middle holders may be made of metal or plastic resin.

The multibeam light source unit may further include a circuit board that is provided on the installation surface of the flange, and drives and controls the plurality of light sources.

The plurality of middle holders may be disposed between the flange and the circuit board.

The flange may include a side wall disposed outside of the installation surface to provide a space that accommodates the plurality of middle holders, and the circuit board may be supported by the side wall.

The plurality of light sources may be multibeam laser diodes.

According to one or more embodiments, a method of adjusting a multibeam light source unit includes providing a light source on a light source mounting unit of a middle holder, with a jig of adjustment equipment holding a jig coupling unit of the middle holder, inserting the light source mounting unit of the middle holder into any one of a plurality of holder installation holes disposed on an installation surface of a flange, providing power to the light source through the jig, with detecting the position and interval of a multibeam emitted from the light source, adjusting at least one of the upward, downward, left, right and rotation directions of the middle holder so that the multibeam has a predetermined position and interval, and fixing to the flange by adhesive, a first fixing protrusion unit and a second fixing protrusion unit formed to protrude outside from the light source mounting unit of the middle holder.

The operations may be repeated until all the light sources are provided to the plurality of holder installation holes of the flange.

In the operation for providing a light source on a light source mounting unit of a middle holder, light sources may be provided to the same number of the plurality of middle holders as the number of the plurality of holder installation holes of the flange, and the other operations may be simultaneously performed for the plurality of middle holders.

The jig may determine the direction of the middle holder according to the shapes of the jig coupling unit of the middle holder.

The adhesive may be photopolymer adhesive, and the fixing of the first and second protrusion unit to the flange may include applying the adhesive on and around the first and second fixing protrusion units of the middle holder, and hardening the adhesive by exposing an ultraviolet beam to the adhesive.

The applying the adhesive may be performed before or after adjusting at least one of the upward, downward, left, right and rotation directions of the middle holder.

The method may include attaching a circuit board that drives and controls the light source, on the installation surface of the flange on which the light source is provided, after completing adjusting and providing the light source on the flange.

The method may comprise attaching the flange on housing of light scanning unit, after completing adjusting and providing the light source on the flange.

According to one or more embodiments, a light scanning unit includes: a multibeam light source unit, a beam deflector that deflects and scans a plurality of multibeams emitted from the multibeam light source unit, an incident optical system that makes the plurality of multibeams emitted from the multibeam light source unit, incident on the beam deflector, and an imaging optical system that enables the multibeam deflected by the beam deflector, to form an image on a scanning surface, wherein the multibeam light source unit includes: a plurality of light sources that emit multibeam, respectively, a flange that has an installation surface on which a plurality of holder installation holes are provided, and a plurality of middle holders on each of which a corresponding one of the plurality of light sources is provided, wherein each of the plurality of the middle holders includes: a light source mounting unit on which one of the plurality of the light sources is provided, a cylinder-shape insertion unit that is inserted into one of the plurality of the holder installation holes, a first fixing protrusion unit and a second fixing protrusion unit, each of which is protruding outside from the light source mounting unit and is fixed to the flange by adhesive, and a jig coupling unit that is coupled with a jig when adjustment is performed.

The incident optical system may be an inclined optical system that enables at least two multibeams among the plurality of multibeams, to be incident, with inclination, on one reflection surface of the beam deflector.

According to one or more embodiments, an electrophotography type image forming apparatus includes a light scanning unit that comprises a multibeam light source unit, a beam deflector that deflects and scans a plurality of multibeams emitted from the multibeam light source unit, an incident optical system that makes the plurality of multibeams emitted from the multibeam light source unit, incident on the beam deflector, and an imaging optical system that enables the multibeam deflected by the beam deflector, to form an image on a scanning surface, a developer unit that comprises a plurality of photoreceptors each of which is disposed where an image of a corresponding one of the plurality of multibeams emitted from the light scanning unit is formed, and on which an electrostatic latent image is formed, and a developer roller that develops the electrostatic latent images formed on the plurality of photoreceptors, and a transfer unit onto that the image developed by the developer unit is transferred, wherein the multibeam light source unit includes a plurality of light sources that emit multibeam, respectively, a flange that has an installation surface on which a plurality of holder installation holes are provided, and a plurality of middle holders on each of which a corresponding one of the plurality of light sources is provided, wherein each of the plurality of the middle holders includes a light source mounting unit on which one of the plurality of the light sources is provided, a cylinder-shape insertion unit that is inserted into one of the plurality of the holder installation holes, a first fixing protrusion unit and a second fixing protrusion unit, each of which is protruding outside from the light source mounting unit and is fixed to the flange by adhesive, and a jig coupling unit that is coupled with a jig when adjustment is performed.

In the multibeam light source unit and the method of adjusting the multibeam light source unit according to the embodiments described above, it is easy to adjust the position and rotation of a light source in an assembly process, and by using adhesive, an assembly process can be reduced.

In the multibeam light source unit and the method of adjusting the multibeam light source unit according to the embodiments described above, the problems of deformation in a fixing process and vulnerability to external environment changes in the structure in which intervals between beams of a multibeam are adjusted are solved.

The light scanning unit employing a multibeam light source unit and the electrophotography type image forming apparatus according to the embodiments, described above, have a compact structure such as an optical system with a titled incident beam, and provide high quality color images.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
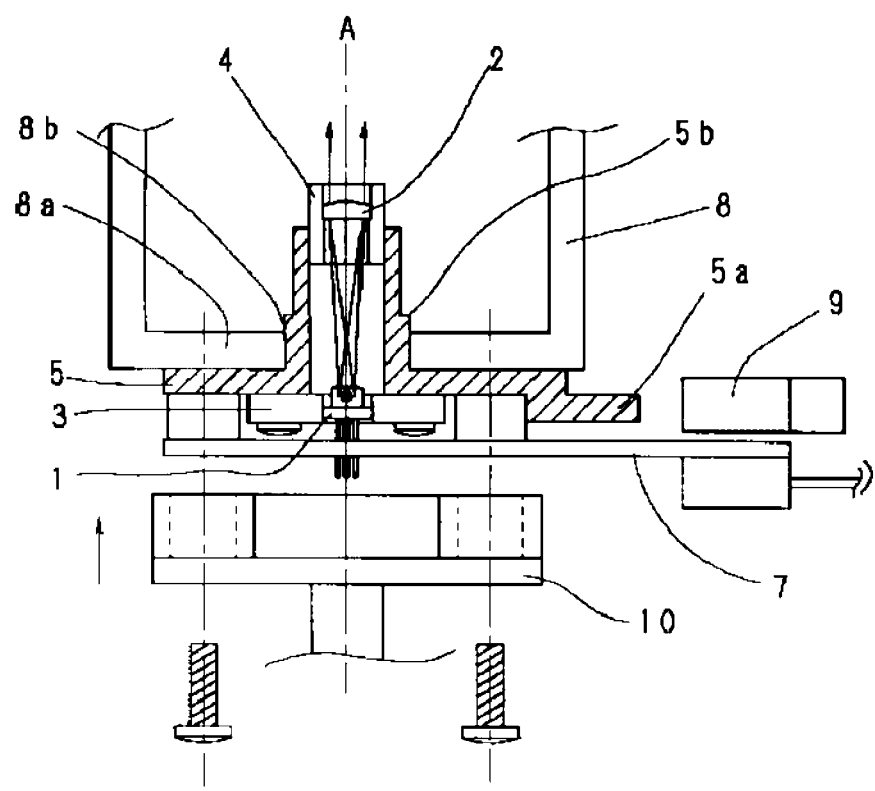
FIGS. 1 and 2 are a diagrams schematically showing structures for adjustment of a light source unit.
Figure 2:
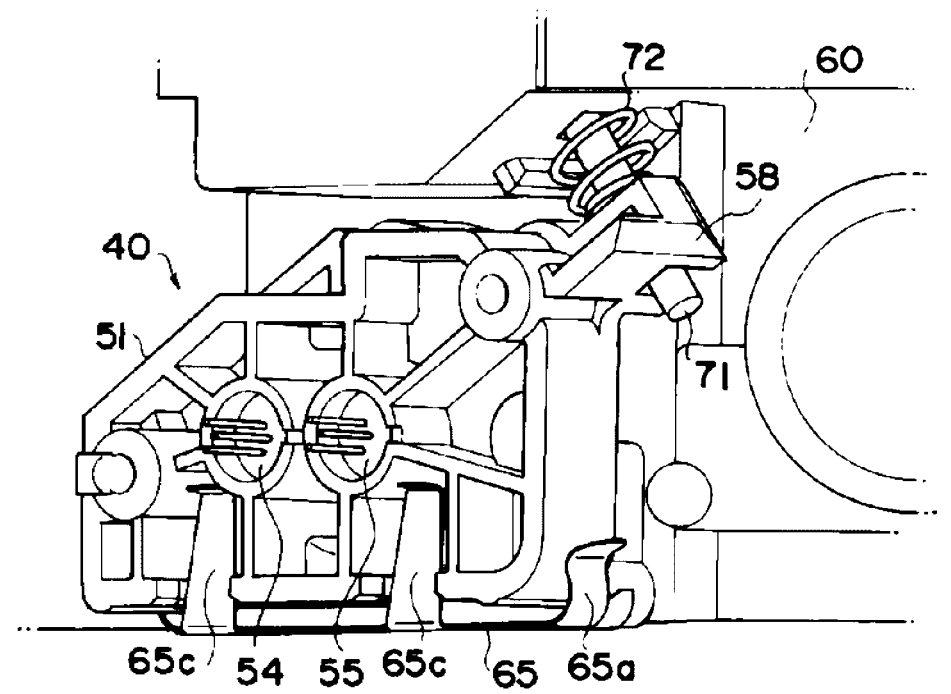

Reference will now be made in detail to embodiments, examples of which are illustrated in the accompanying drawings, wherein like reference numerals refer to like elements throughout. In the drawings, a size and thickness an element may be exaggerated for clarity.

As used herein, the term "and/or" includes any and all combinations of one or more of the associated listed items. Expressions such as "at least one of," when preceding a list of elements, modify the entire list of elements and do not modify the individual elements of the list.

Figure 3:
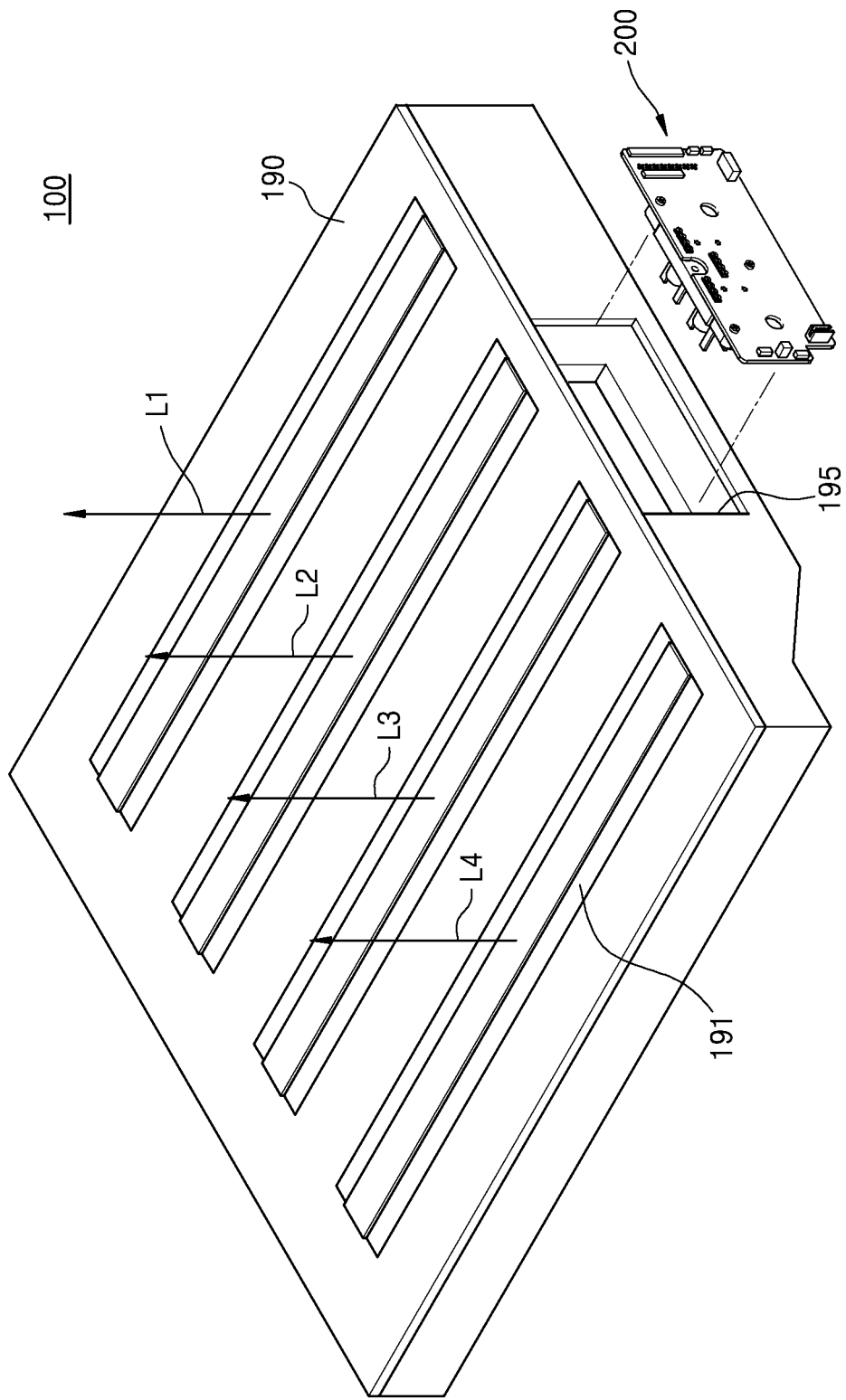
FIG. 3 illustrates an optical housing of a light scanning unit and a multibeam light source unit that is mounted on the optical housing according to an exemplary embodiment.

FIG. 3 illustrates an optical housing 190 of a light scanning unit 100 and a multibeam light source unit 200 that is provided on the optical housing 190 according to an exemplary embodiment.

Referring to FIG. 3, the light scanning unit 100 is a device scanning multibeams, for example, four multibeams L1 through L4. The multibeam light source unit 200 provided on the light scanning unit 100 emits four multibeams L1 through L4.

The optical housing 190 may be formed with, for example, plastic resin, and may be manufactured by using injection molding. On the front surface of the optical housing 190, four windows 191 through which four multibeams L1 through L4 are emitted may be formed. On one side surface of the optical housing 190, an installation unit 195, on which the multibeam light source unit 200 may be provided, may be formed. As described with reference to FIGS. 12 through 14, the optical system of the light scanning unit 100 may be provided inside the optical housing 190.

The multibeam light source unit 200 may be provided in the installation unit 195 of the optical housing 190, and thus four multibeams L1 through L4 may be emitted from one side surface of the optical housing 190.

Figure 4:
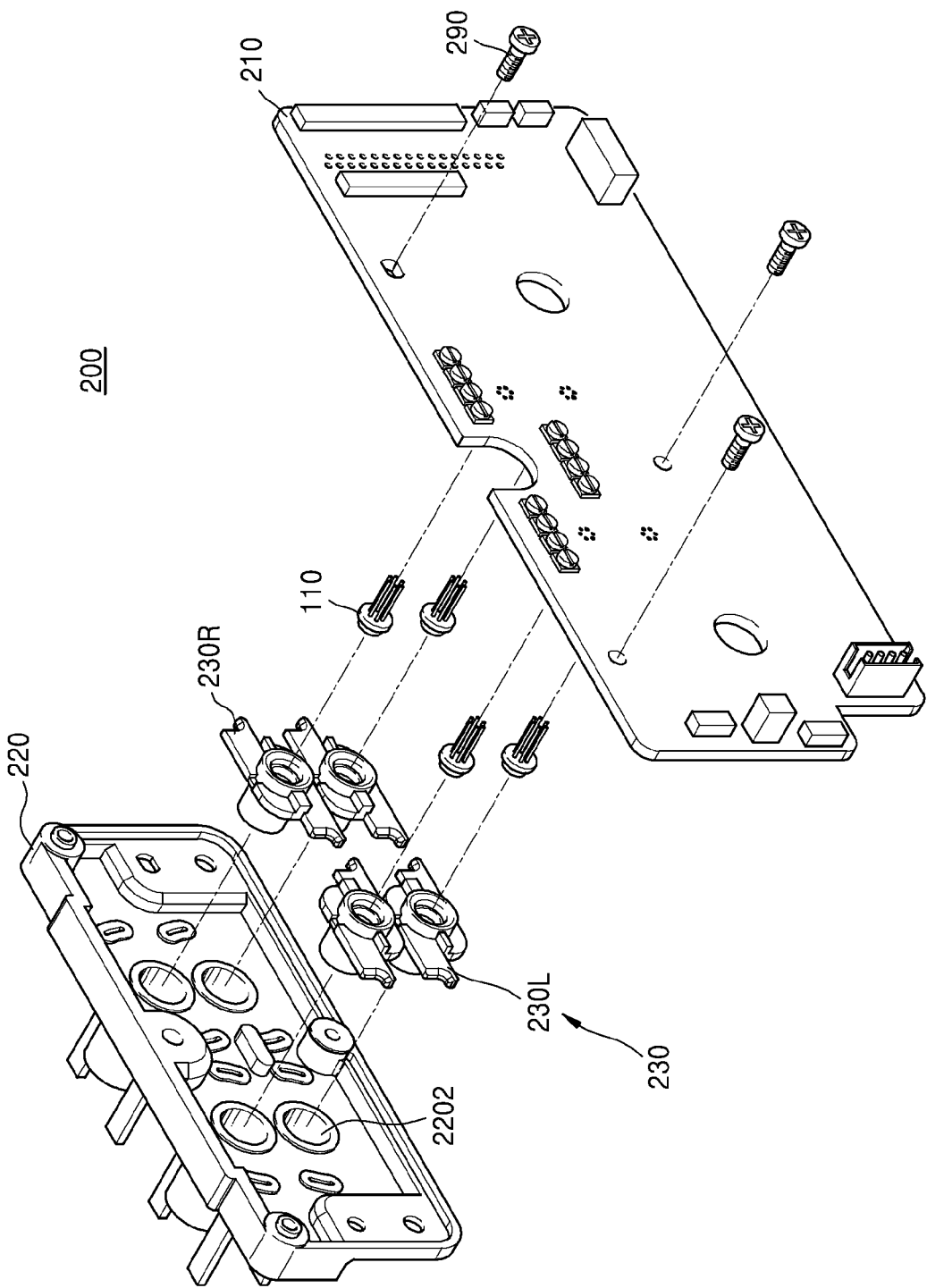
FIG. 4 is an exemplary exploded perspective view of a multibeam light source unit.
Figure 5:
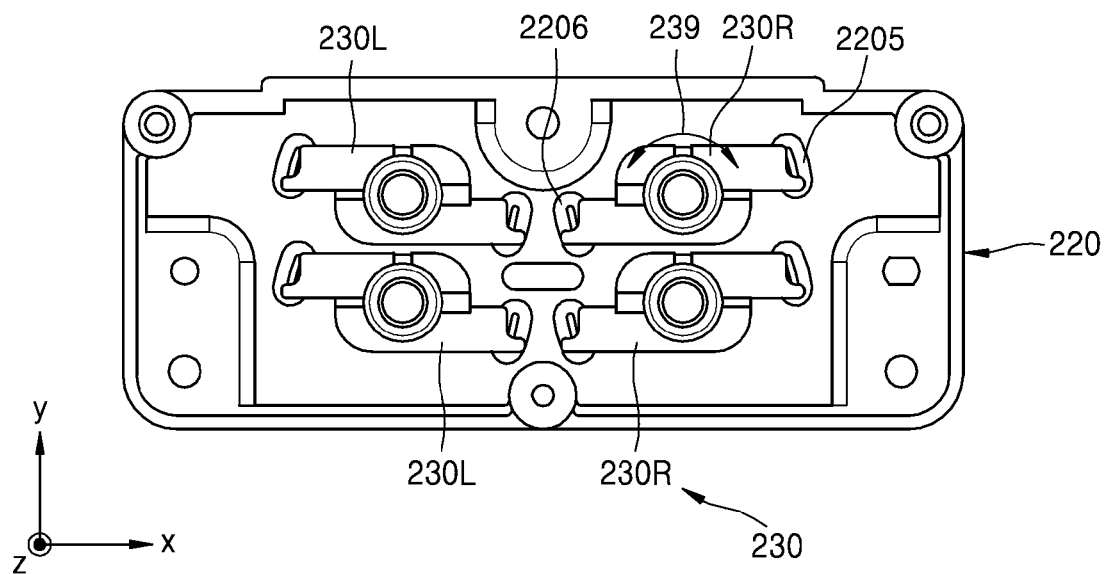
FIG. 5 illustrates an example in which a middle holder is coupled to a flange in a multibeam light source unit.
Figure 6:
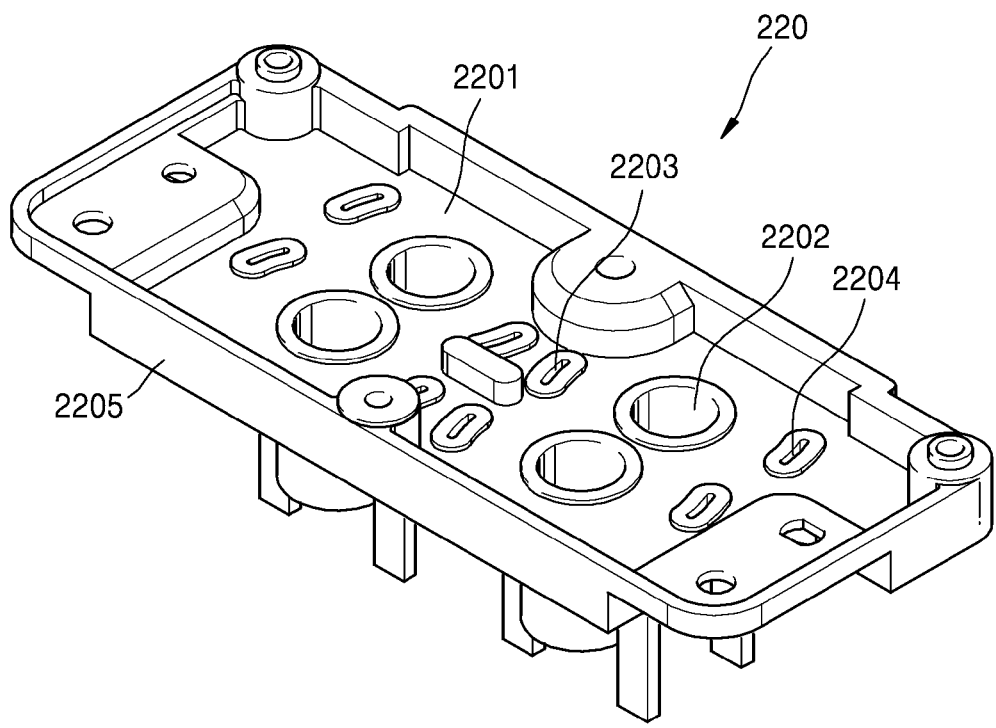
FIG. 6 is a perspective view of an exemplary flange of a multibeam light source unit.
Figure 7:
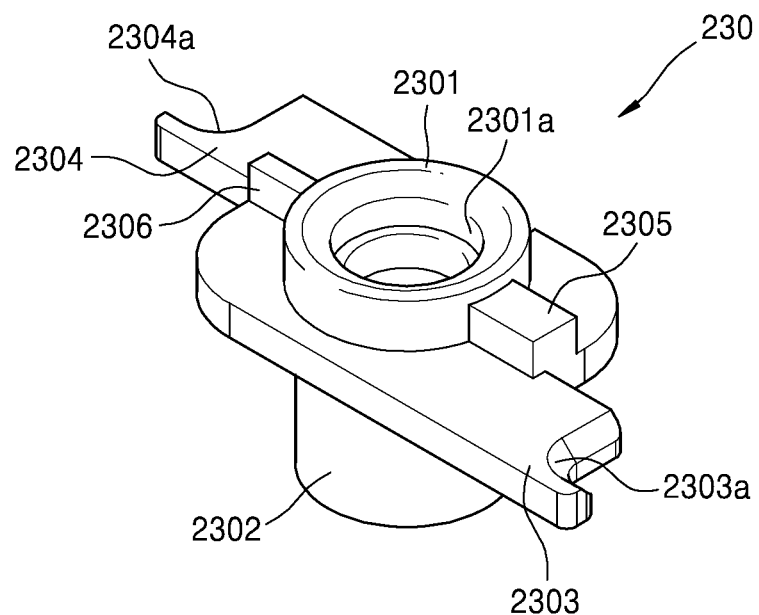
FIG. 7 is a perspective view of an exemplary middle holder of the multibeam light source unit.

FIG. 4 is an exploded perspective view of an exemplary multibeam light source unit 200, FIG. 5 illustrates an example in which a middle holder 230 is coupled to a flange 220, FIG. 6 is a perspective view of a flange 220, and FIG. 7 is a perspective view of a middle holder 230.

Referring to FIG. 4, the multibeam light source unit 200 includes light sources, for example, four light sources 110, a circuit board 210 driving and controlling the four light sources 110, a flange 220, and middle holders, for example, four middle holders 230.

Each of the four light sources 110 may be a multibeam light source emitting a multibeam, and may be, for example, a multibeam laser diode. A multibeam emitted from each of the light sources 110 may be a plurality of light beams that are emitted with a predetermined interval between beams. In one scanning operation, the plurality of light beams may form, simultaneously, a plurality of scanning lines on an same scanning surface.

The four light sources 110, each of which may be fixed to a corresponding one of the four middle holders 230, may be provided on the flange 220.

The flange 220 supports the middle holders 230 to which the light sources are fixed, and thus the middle holders 230 may be adjusted by rotation. Referring to FIGS. 5 and 6, the flange 220 includes an installation surface 2201 on which four middle holders 230 may be provided. On the installation surface 2201, four holder installation holes 2202 may be formed. Each of the holder installation holes 2202 may have a shape corresponding to the external shape of an insertion unit 2302 (for example, illustrated in FIG. 7) of the middle holder 230, and thus the insertion unit 2302 of the middle holder 230 may be inserted into the holder installation hole 2202. For example, if the insertion unit 2302 of the middle holder 230 has a cylinder shape, the holder installation hole 2202 may have a cylindrical aperture shape. The four holder installation holes 2202 may be disposed in bilateral symmetry.

The four holder installation holes 2202 may be located in rows and columns, for example, two rows and two columns with respect to a main scanning direction (x-axis direction) and a sub scanning direction (y-axis direction). According to an arrangement of the four holder installation holes 2202, the four light sources 110 can be densely disposed in two rows and two columns, and thus the light scanning unit 100 may employ an inclined optical system. The main scanning direction (x-axis direction) and the sub scanning direction (y-axis direction) may be determined based on a time when the multibeam light source unit 200 is coupled to the optical housing 190 of the light scanning unit 100 as described with reference to FIGS. 12 through 14.

On the installation surface 2201 of the flange 220, a first fixing groove unit 2203 and a second fixing groove unit 2204 may be formed in the vicinity of each of the four holder installation holes 2202. Each of the first and second fixing groove units 2203 and 2204 may be provided in a location in contact with a corresponding one of a first fixing protrusion unit and a second fixing protrusion unit 2303 and 2304 of FIG. 7 of the middle holder 230. When the middle holder 230 is fixed to the flange 220 with adhesive 660 (for example, illustrated in FIG. 19E), the first and second fixing groove units 2203 and 2204 take at least part of the adhesive to prevent excessive adhesive from flowing around, for example, to contaminate other areas. The first and second fixing groove units 2203 and 2204 may be disposed in the diagonal direction centering around the holder installation holes 2202. The first and second fixing groove units 2203 and 2204 may be formed in a titled state with respect to the main scanning direction (x-axis direction). In order to correspond to movements of the first and second fixing protrusion units 2303 and 2304 when the middle holder 230 is adjusted by rotation 239, the first and second fixing groove units 2203 and 2004 may be formed, for example, by being extended in an arc shape, for example, centering around the holder installation holes 2202. The four pairs of the first and second fixing groove units 2203 and 2204 formed around the corresponding four holder installation holes 2202 may be disposed in bilateral symmetry on the installation surface 2201 of the flange 220. Accordingly, with securing a rotation space of the middle holder 230, the middle holder 230 can be provided in a maximum density.

The flange 220 may include a side wall 2205 to be formed on the outside of the installation surface 2201, and thus a space in which the four middle holders 230 may be accommodated. As illustrated in FIG., the circuit board 210 may be supported by the side wall 2205 and coupled with the flange 220 by screws 290. That is, the four middle holders 230 may be disposed in a space between the flange 220 and the circuit board 210.

The middle holder 230 may be provided to fix the light source 110 and to adjust the light source 110 by rotation. Since a multibeam emitted from the light source 110 includes a plurality of light beams, if the light source 110 is rotated, the interval between beams in the sub scanning direction of the multibeam is adjusted to a desired interval.

As illustrated in FIGS. 4 and 5, the middle holders 230 may include left middle holders 230L disposed on the left-hand side of the installation surface 2201 of the flange 220 and right middle holders 230R disposed on the right-hand side of the installation surface 2201. The left middle holders 230L and the right middle holders 230R may have shapes of bilateral symmetry. This may correspond to the arrangement in which the first and second fixing groove units 2203 and 2204 of each of the four holder installation holes 2202 of the flange 220 are disposed in bilateral symmetry on the installation surface 2201. Hereinafter, an explanation referring to FIG. 7 is with respect to the left middle holder 230L. The right middle holder 230R may be understood as having a shape bilaterally symmetrical to that of the middle holder 230 illustrated in FIG. 7.

Figure 19A:
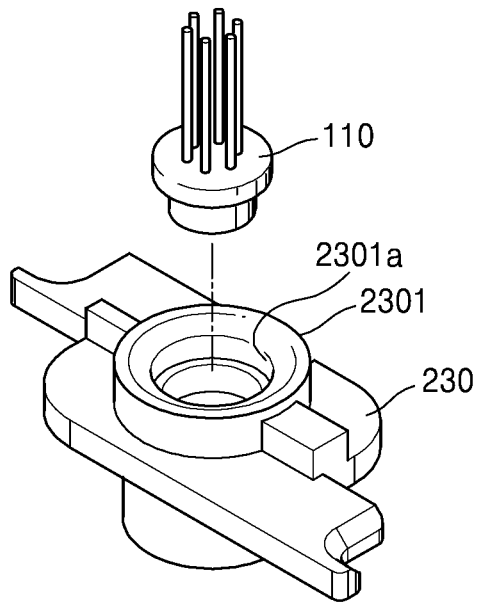
FIGS. 19A through 19F illustrate exemplary operations of a method of adjusting a multibeam light source unit.
Figure 19B:
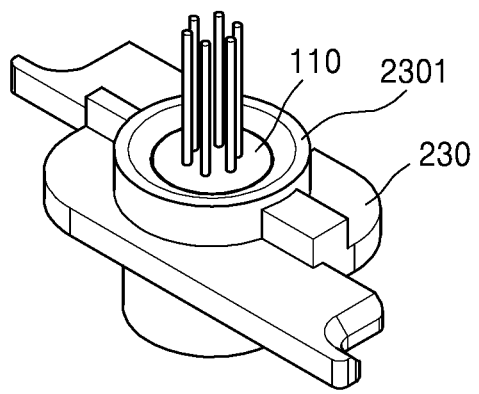
Figure 19C:
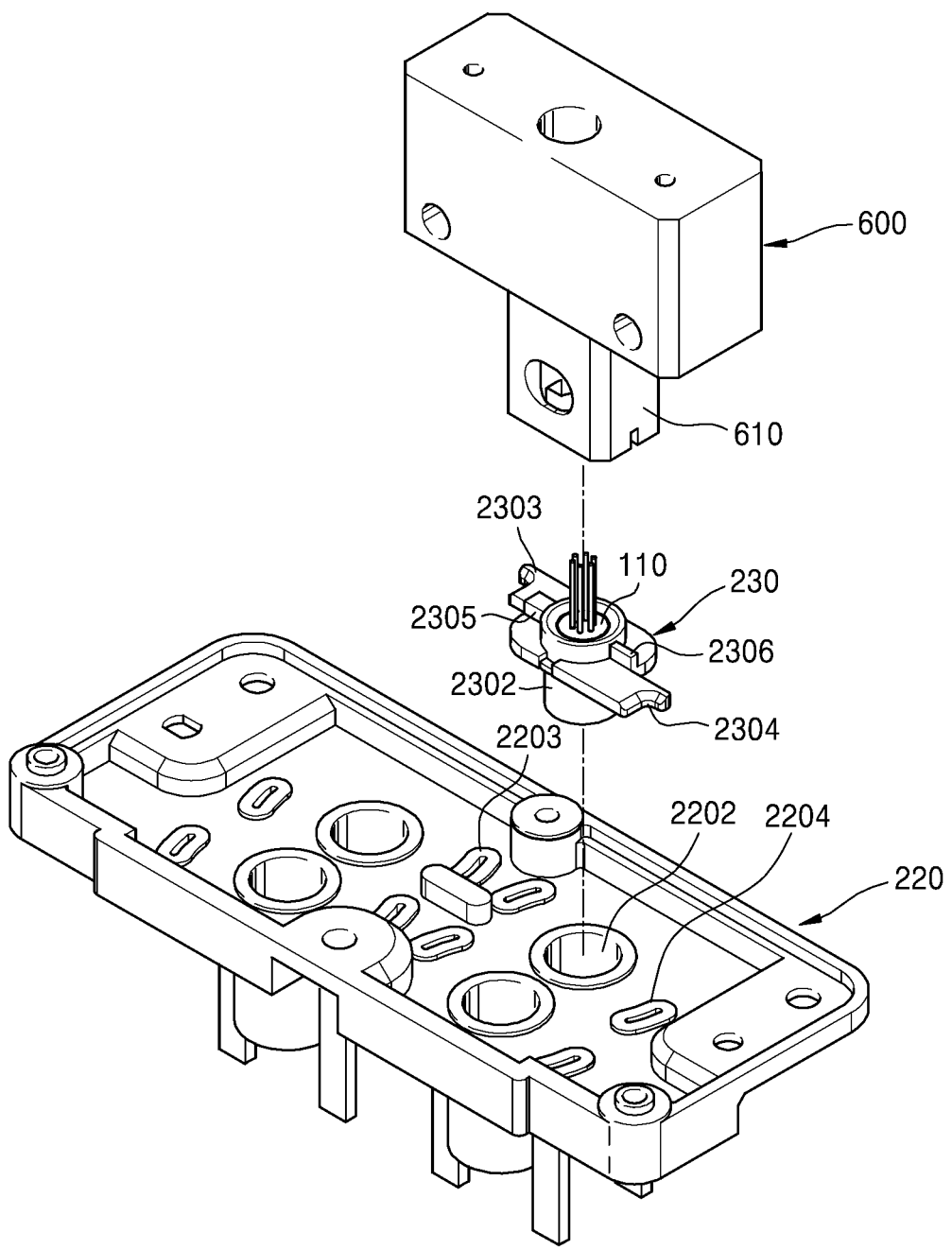

Referring to FIG. 7, the middle holder 230 includes a light source mounting unit 2301 in which one light source 110 may be provided, an insertion unit to insert into the holder installation hole 2202 of the flange 220, a first fixing protrusion unit 2303 and a second fixing protrusion unit 2304 to fix to the flange 220, and a first jig coupling unit 2305 and a second jig coupling unit 2306 to couple with a jig 600 (for example, illustrated in FIG. 19C).

The light source mounting unit 2301 may have a cylinder shape having a penetration hole 2301a. The shape of the penetration hole 2301a may vary according to the external shape of the light source 110. For example, if the light source 110 has a cylinder shape, the shape of the penetration hole 2301a may be a cylindrical aperture.

The insertion unit 2301 may be inserted into the holder installation hole 2202 of the flange 220 and may have a cylinder shape. Between the insertion unit 2302 and the holder installation hole 2202, a sealing member with a low density, such as polyurethane, may be provided, and thus inflow of foreign substances through the holder installation holes 2202 of the flange 220 may be prevented after assembly. The insertion unit 2302 may be formed by being extended from the light source mounting unit 2301, and the penetration hole 2301a of the light source mounting unit 2301 penetrates to the end of the insertion unit 2302. The light source 110 pressed into the penetration hole 2301a of the light source mounting unit 2301 and 2301a may be attached to the insertion unit 2302.

Adhesive may be applied to the first and second fixing protrusion units 2303 and 2304, and thus the middle holder 230 may be fixed to the flange 220. The first and second fixing protrusion units 2303 and 2304 may be formed by being extended, for example, in the diagonal direction centering around the light source mounting unit 2301, for example, in a wing shape. In other words, except the shapes of a first concave unit 2303a and a second concave unit 2304B as described later, the shapes of the first and second fixing protrusion units 2303 and 2304 may be formed in rotational symmetry (in other words, point symmetry) in relation to a rotation about the light source mounting unit 2301.

Each of the first and second fixing protrusion units 2303 and 2304 may include a corresponding one of a first concave unit 2303a and a second concave unit 2304a that may be formed by removing part of the ends of the first and second fixing protrusion units 2303 and 2304. The locations in which the first and second concave units 2303a and 2304a may be formed may be determined by considering a space in which the first and second fixing protrusion units 2303 and 2304 move when they rotate about the light source mounting unit 2301. For example, when the middle holder 230 rotates clockwise about the light source mounting unit 2301, the first concave unit 2303a of one side may have a shape in which a downstream side is concave, and the second concave unit 2304a of the other side may have a shape in which an upstream side is concave. As an example, both of the first and second concave units 2303a and 2304a may be formed concave on the downstream sides or upstream sides in a rotation about the light source mounting unit 2301 (that is, in a rotational symmetric form).

These shapes of the first and second fixing protrusion units 2303 and 2304 and the first and second concave units 2303a and 2304a may correspond to the arrangement of the four holder installation holes 2202 in the flange 220 and the first and second fixing groove units 2203 and 2204 of the each holder installation hole 2202 as described with reference to FIGS. 5 and 6. Accordingly, while the four middle holders 230 may be densely disposed, a space in which the first and second fixing protrusion units 2303 and 2304 move without interfering each other when adjustment is performed by rotation may be maintained, and a space in which adhesive 660 (illustrated in FIG. 19E) is applied may be maintained. As the first and second fixing protrusion units 2303 and 2304 may be formed symmetrically about the light source mounting unit 2301, deformation of a shape by external force is dispersed, and resistance to vulnerability to characteristic changes by external environment changes improves.

Fixing of the middle holder 230 may be performed by using adhesive after adjustment of the light source 110 (that is, adjustment of the four middle holders 230) is completed. By fixing the middle holder 230 by using adhesive, the influence of variation in the coupling powers of the four middle holders 230, coupling order, and intervals is minimized, and thus, distortion of the flange 220 or the middle holder 230, and position deviation may be prevented in a fixing process. Considering convenience of fixing, a photopolymer adhesive may be used as the adhesive, but the types of adhesive are not limited to this.

The first and second jig coupling units 2305 and 2306 may be coupled with the jig 600 (illustrated in FIG. 19C) of an adjustment unit when the middle holder 230 is adjusted by rotation. The first and second jig coupling units 2305 and 2306 may have protrusion shapes protruding on the left and right of the light source mounting unit 2301. The first and second jig coupling units 2305 and 2306 may be disposed in the diagonal direction with the light source mounting unit 2301 as a center. The first and second jig coupling units 2305 and 2306 may have shapes different from each other. For example, as illustrated in FIG. 5, the first and second jig coupling units 2305 and 2306 may be formed to have different thicknesses. The lengths or heights may be formed different from each other, or the shapes may be formed different from each other. Thus, the first and second jig coupling units 2305 and 2306 may have shapes different from each other, and the direction of the left and right of the middle holder 230 may be specified when assembling the multibeam light source unit 200.

The middle holder 230 may be formed with a metallic material to enhance the heat radiation effect of the light source 110, and thus the characteristic change caused by heat may be reduced. The middle holder 230 may be formed with plastic resin.

FIGS. 8A through 8E illustrate middle holders 231, 232, 233, 234, and 235 of embodiments that may be included in a multibeam light source unit 200.

In order to secure a wider area to which adhesive 660 (for example, illustrated in FIG. 19E) is applied, the middle holder 230 explained with reference to FIG. 5, may have first and second concave units 2303a and 2304a that are formed by removing part of the ends of the first and second fixing protrusion units 2303 and 2304. However, the middle holder 230 may be embodied in a variety of different forms. For example, in the middle holder 231 illustrated in FIG. 8A, penetration holes 2313a and 2314a are formed at the end of the two fixing protrusion units 2313 and 2314, and thus adhesive may be applied centering around the penetration holes 2313a and 2314a and a wider area for applying the adhesive is obtained. As illustrated in the fixing protrusion units 2323 and 2324 of the middle holder 232 of FIG. 8B or in the fixing protrusion units 2333 and 2334 of the middle holder 233 of FIG. 8C, there may be no separate shape changes.

Figure 8A:
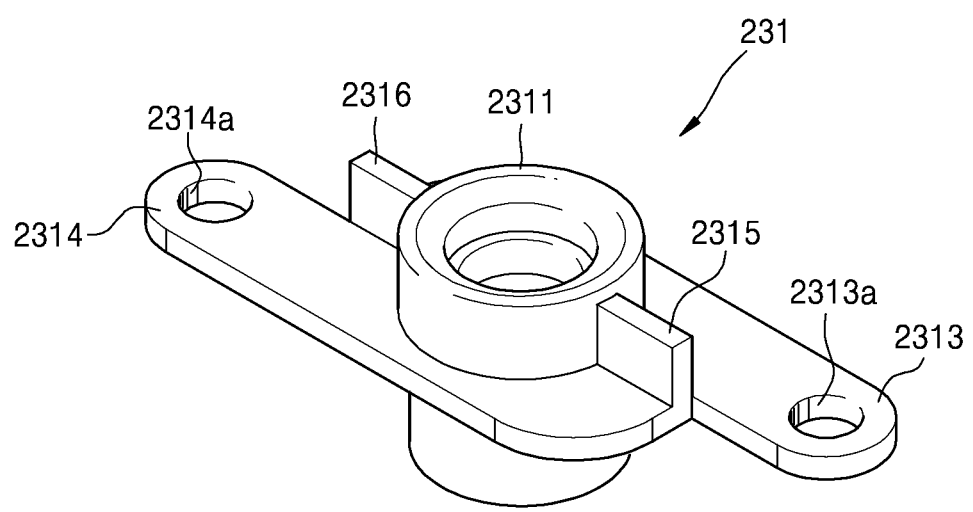
FIGS. 8A through 8E illustrate exemplary middle holders in a multibeam light source unit.
Figure 8B:
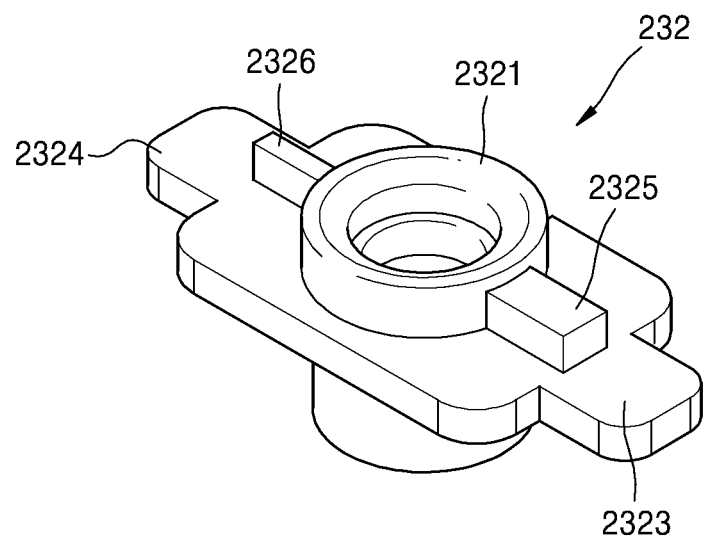

In the middle holder 230 explained with reference to FIG. 5, the left and right sides may be distinguished from each other, but the embodiments are not limited to this. For example, referring to FIG. 8A, in the middle holder 231, the two fixing protrusion units 2313 and 2314 and the two jig coupling units 2315 and 2316 may be formed on both sides of the light source mounting unit 2311 in rotational symmetry. Accordingly, the middle holder 231 has a rotational symmetrical shape as a whole. Referring to FIG. 8B, in the middle holder 232, the two fixing protrusion units 2323 and 2324 are formed in bilateral symmetry on both sides of the light source mounting unit 2321, but the two jig coupling units 2325 and 2326 may be formed to have shapes different from each other.

Figure 8C:
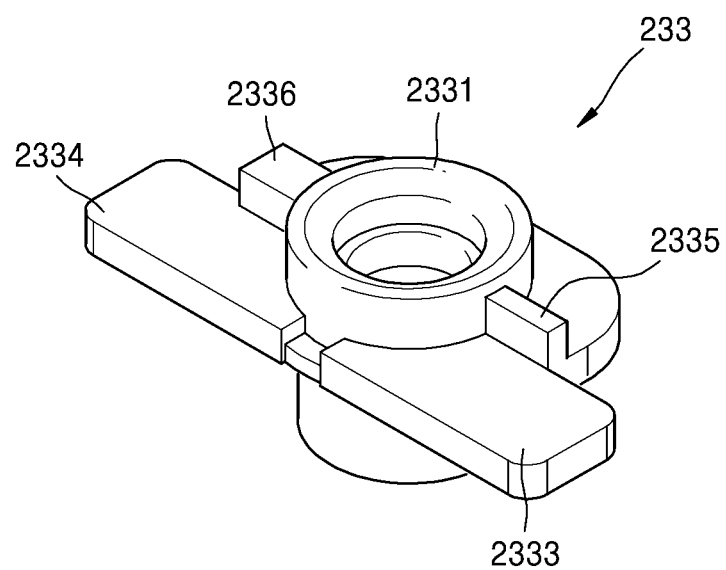
Figure 8D:
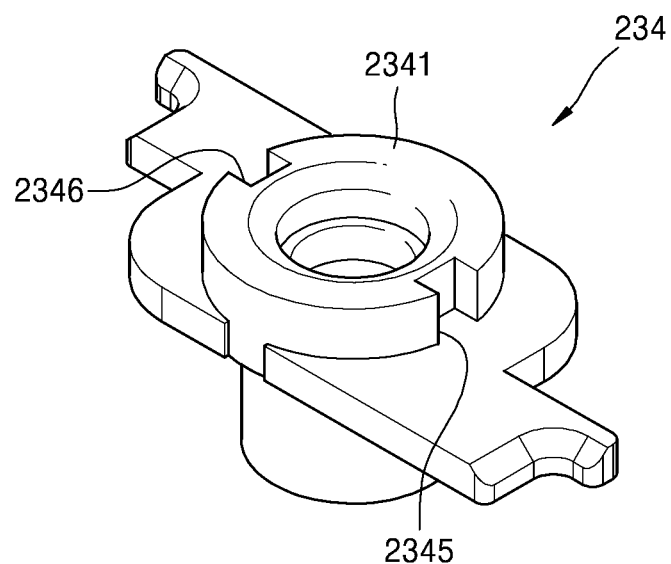

As illustrated in FIG. 8C, in the middle holder 233, the two fixing protrusion units 2333 and 2334 may be formed in bilateral symmetry on both sides of the light source mounting unit 2331, but the two jig coupling units 2335 and 2336 may be formed to have shapes different from each other.

In the middle holder 230 explained with reference to FIG. 5, the two fixing protrusion units 2303 and 2304 may be formed symmetrically in the diagonal direction centering around the light source mounting unit 2301. The middle holder 230 may be embodied in a variety of different forms. For example, referring to FIG. 8C, in the middle holder 233, the two fixing protrusion units 2333 and 2334 may be formed on only one side of the light source mounting unit 2331.

Figure 8E:
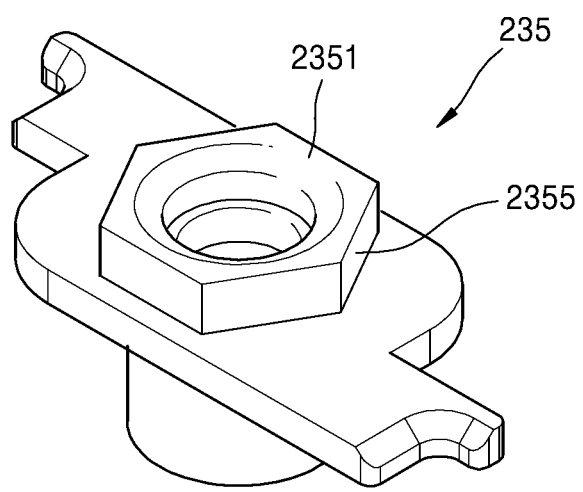

In the middle holder 230 explained with reference to FIG. 5, the jig coupling units 2305 and 2306 may be formed to have protrusion shapes, but may be embodied in a variety of different forms. For example, referring to FIG. 8D, the middle holder 234 may be formed to have jig coupling units 2345 and 2346 that are formed as concave grooves on both sides of the light source mounting unit 2341. More than three of protrusions or concave grooves may be formed as the jig coupling unit. Referring to FIG. 8E, in the middle holder 235, the outer circumference surface of the light source mounting unit 2351 may be formed to have a canted column shape, and thus, the canted column shape of the outer circumference of the light source mounting unit 2351 may perform as a jig coupling unit 2355.

The shapes of the middle holders 230 through 235 of the embodiments and modifications may be substitutes for each other within a compatible range.

The shapes of the middle holders 230 through 235 of the embodiments and modifications may reduce the sizes of the middle holders 230 through 235, and thus, on the installation surface 2201 of the flange 220 having a limited space for installation, the middle holders 230 through 235 may be disposed densely and adjustment of positions and rotation may be performed without interference.

Through minimization of the size of the middle holders 230 through 235 and simplification of jig coupling units, adjustment processes of multiple middle holders 230 through 235 may be performed simultaneously to reduce working hours and through miniaturization, material cost may be reduced.

The bilateral- or rotational-symmetrical shapes of the middle holders 230 through 235 symmetrically disperse changes caused by external environment changes, and thus minimize the influence of a change with the passage of time.

The middle holders 230 through 235 of the embodiments and modifications described above are explained with examples having two fixing protrusion units. However, the middle holder 230 may be embodied in a variety of different forms. The middle holder may have three or more protrusion units.

Figure 9:
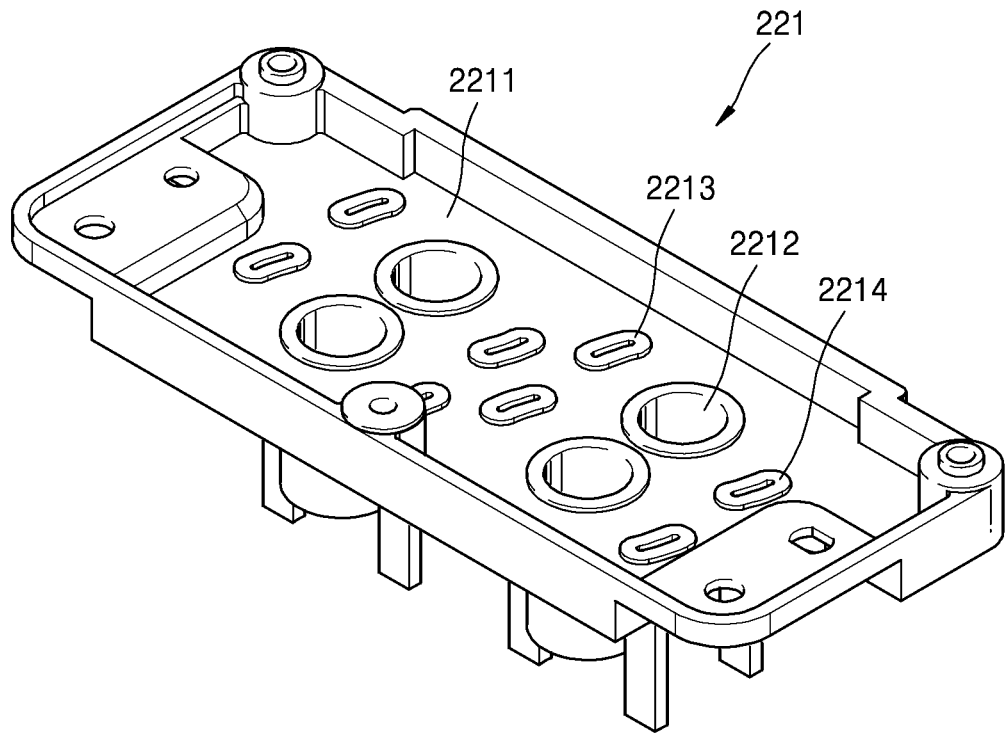
FIG. 9 illustrates an exemplary flange in a multibeam light source unit.
Figure 10:
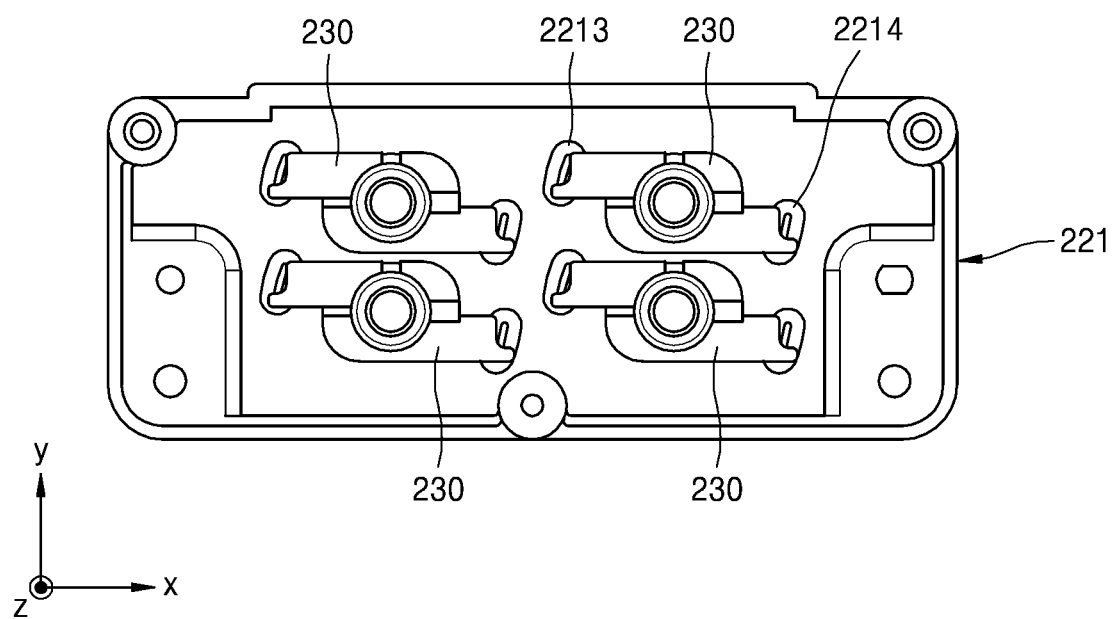
FIG. 10 illustrates an example in which a middle holder is assembled to a flange.

FIG. 9 is a diagram of a flange 221 according to an embodiment that may be used in the multibeam light source unit 200. FIG. 10 illustrates an example in which a middle holder 230 is assembled to the flange 221. Referring to FIGS. 9 and 10, in the flange 221, four holder installation holes 2212 may be disposed in two rows and two columns on the installation surface 2211 with respect to a main scanning direction (x-axis direction) and a sub scanning direction (y-axis direction). A first fixing groove unit 2213 and a second fixing groove unit 2214 may be formed in the vicinity of each of the four holder installation holes 2212. The first and second fixing groove units 2213 and 2214 may be disposed in the diagonal direction on the installation surface 2211 of the flange 221 centering around each of the four holder installation holes 2202. As described with reference to FIG. 7, each of the middle holders 230 may have the first and second fixing protrusion units 2303 and 2304 that are diagonally disposed centering around the light source mounting unit 2301, and thus the middle holders 230 may be provided to the flange 221. The middle holders 231, 232, 234 and 235 illustrated in FIGS. 8A, 8B, 8D, and 8E may be provided to the flange 221.

The first and second fixing groove units 2213 and 2214 may be disposed to have an identical orientation with respect to a corresponding one of the four holder installation holes 2212. Thus, since the first and second fixing groove units 2213 and 2214 are disposed in the same orientation with respect to a corresponding one of the four holder installation holes 2212, identical middle holders 230 may be used. For example, the same (left) middle holders 230 explained above with reference to FIG. 7 may be used for all the four holder installation holes 2202.

Figure 11:
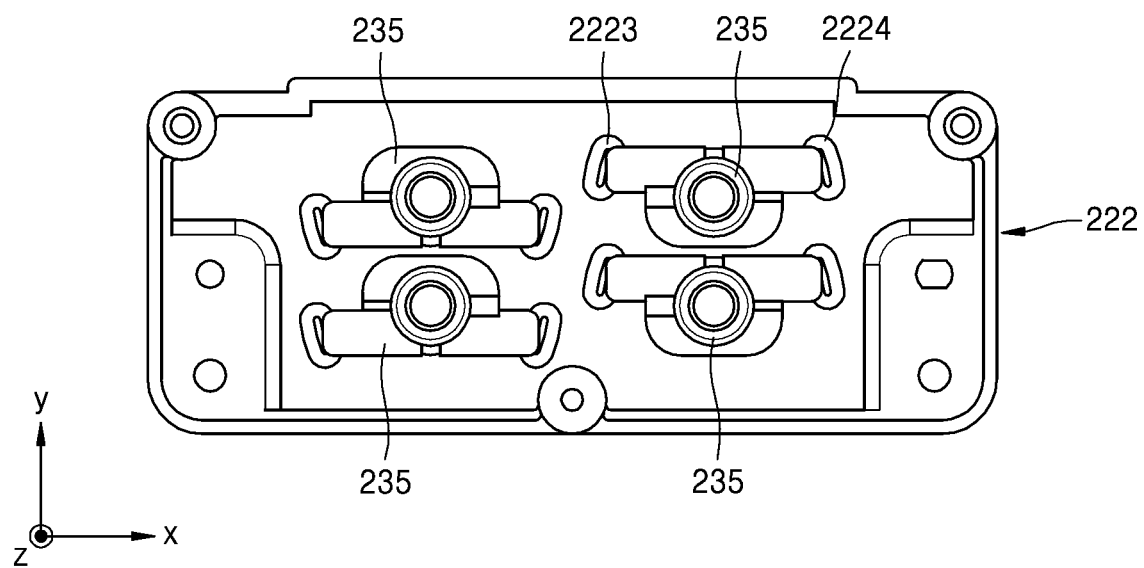
FIG. 11 illustrates an example in which a middle holder is assembled to a flange in a multibeam light source unit.

FIG. 11 illustrates an example in which a middle holder 235 is assembled to another flange 222 that is employed in the multibeam light source unit 200 illustrated in FIG. 3. Referring to FIG. 11, on the installation surface 2221 of the flange 222 according to an embodiment, four holder installation holes 2222 are disposed in two rows and two columns with respect to a main scanning direction (x-axis direction) and a sub scanning direction (y-axis direction). A first fixing groove unit 2223 and a second fixing groove unit 2224 may be provided in the vicinity of each of the four holder installation holes 2222. The first and second fixing groove units 2223 and 2224 may be disposed on one side of the holder installation hole 2222. This one-sided arrangement of the first and second fixing groove units 2223 and 2224 corresponds to the arrangement, described above referring to FIG. 8C, in which the two protrusion units 2333 and 2334 of the middle holder 233 are disposed on the one side of the light source mounting unit 2331.

The embodiments of the flanges 220 through 222 and the middle holders 230 through 235, described above, are examples in which four light sources 110 may be disposed densely in two rows and two columns. Thus, a more variety of arrangements and variations may be provided additionally.

Figure 12:
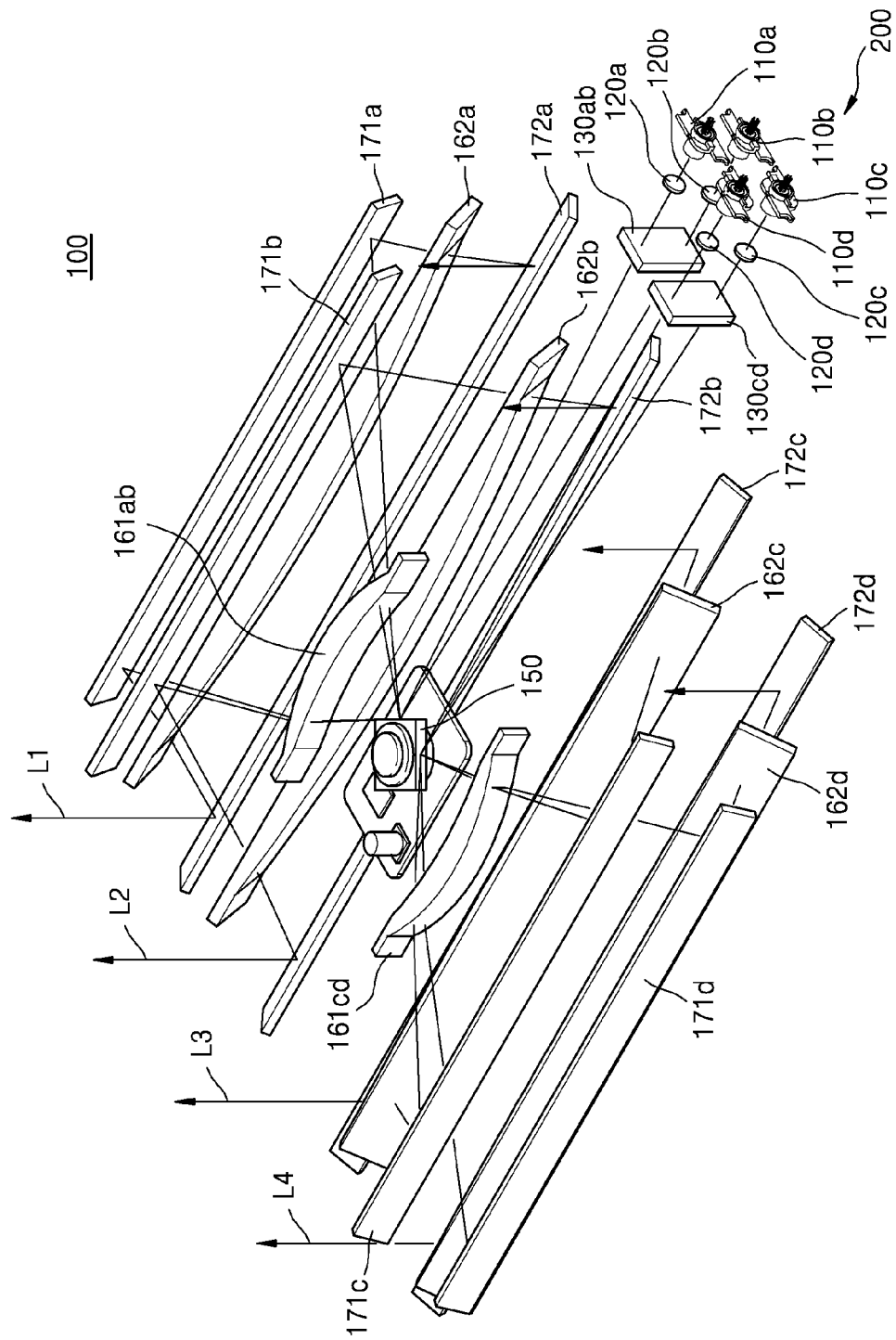
FIG. 12 illustrates an example of optical system arrangement of a light scanning unit.
Figure 13:
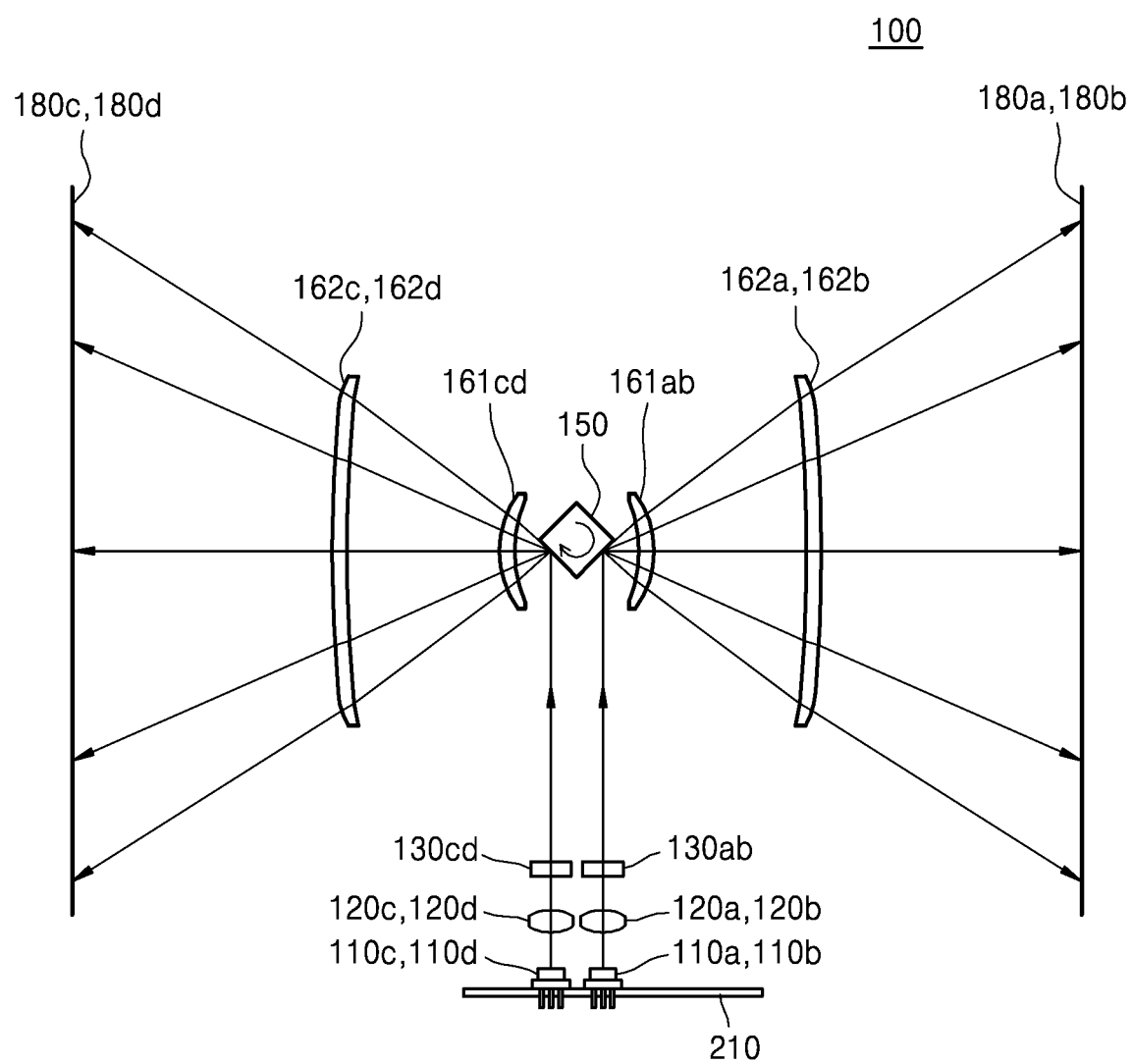
FIG. 13 illustrates an exemplary optical system of an optical scanning system on a main scanning plane.
Figure 14:
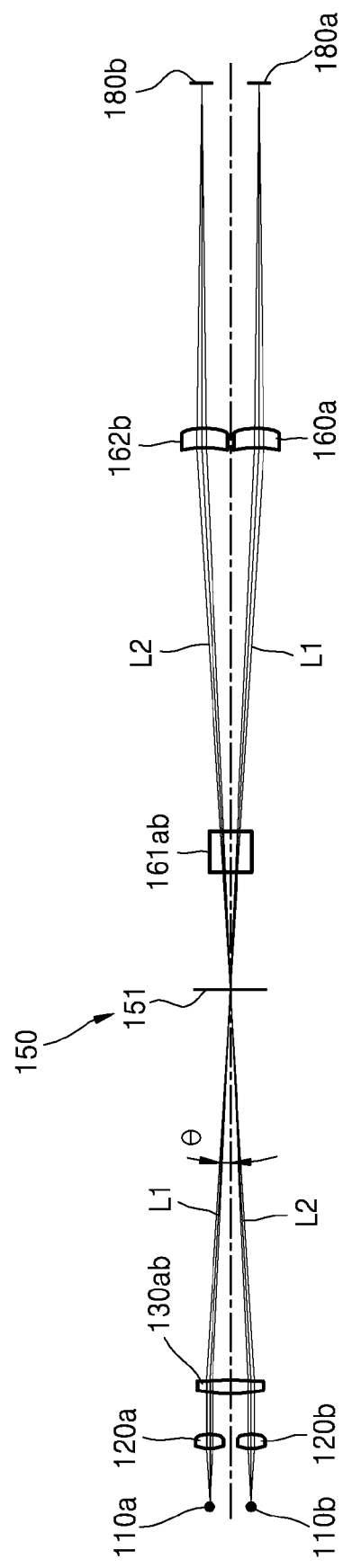
FIG. 14 illustrates an exemplary optical system of an optical scanning system on a sub scanning plane.

FIG. 12 illustrates an example of optical system arrangement of the light scanning unit 100 illustrated in FIG. 3, FIG. 13 illustrates the optical system of the optical scanning system 100 illustrated in FIG. 12 illustrated on a main scanning plane, and FIG. 14 illustrates the optical system of the optical scanning system 100 illustrated in FIG. 12 illustrated on a sub scanning plane. Folding of a beam path in the image forming optical system is not illustrated in FIG. 13 for simplification of drawing. Likewise, the reflection surface of a beam deflector 150 and the folding of a beam path in the image forming optical system are not illustrated in FIG. 14 for simplification of drawing. Reference number 151 in FIG. 14 indicates any one reflection surface 151 of the beam deflector 150. The main scanning plane (or a main scanning section) may be defined as a surface on which each of the first through fourth multibeams L1 through L4 are incident when the first through fourth multibeams L1 through L4 are deflected and scanned by the rotation of the beam deflector 150. The main scanning plane of each of the first through fourth multibeams L1 through L4 is in parallel with both of the traveling direction and main scanning direction of each of the first through fourth multibeams L1 through L4. In other words, when reflection units 171a through 171d and 172a through 172d are in absence, main scanning plane of each of the first through fourth multibeams is perpendicular to the rotation axis of the beam deflector 150. The main scanning direction may be defined as a direction, seen from a scanning surface, into which the first through the fourth multibeams L1 through L4 are deflected by the rotation of the beam deflector 150. The sub scanning plane (or sub scanning section) may be defined as a plane orthogonal to the main scanning direction. The sub scanning plane is in parallel with the travelling direction and sub scanning direction of the first through fourth multibeams L1 through L4. The sub scanning direction may be defined as a direction of normal to the main scanning plane, and is a direction perpendicular to both the travelling direction and main scanning direction of the first through fourth multibeams L1 through L4. The sub scanning direction corresponds to the direction a scanning surface is moving by the rotation of a photo-sensitive drum 710 (illustrated in FIG. 20).

Referring to FIGS. 12 through 14, the light scanning unit 100 according to an embodiment includes a multibeam light source unit 200 emitting the first through fourth multibeams L1 through L4. The multibeam light source unit 200 includes the first through fourth light sources 110a through 110d. As the first through fourth light sources 110a through 110d, multibeam laser diodes may be provided. That is, each of the first through fourth multibeams L1 through L4 includes a plurality of light beams. As each of the first through fourth multibeams L1 through L4 is a multibeam, a plurality of scanning lines may be formed on a first scanning surface 180a through a fourth scanning surface 180d in one scanning operation. In FIGS. 12 through 14, the first through fourth multibeams L1 through L4 are expressed as one light beam for convenience of explanation. The first through fourth light sources 110a through 110d may emit each of the first through fourth multibeams L1 through L4 that are modulated according to image signals corresponding to, for example, image information of colors of black (K), magenta (M), yellow (Y), and cyan (C).

The first through fourth multibeams L1 through L4 emitted from the first through fourth light sources 110a through 110d are deflected by one beam deflector 150 and scanned. The beam deflector 150 may be, for example, a rotating polygon mirror that has a plurality of reflecting surfaces rotating about a rotational axis. As an example, the beam deflector 150 may be a microelectromechanical systems (MEMS) mirror.

The first and second light sources 110a and 110B may be disposed such that the first and second multibeams L1 and L2 are incident on any one reflection surface of the beam deflector 150, and the third and fourth light sources 110C and 110d may be disposed such that the third and fourth multibeams L3 and L4 are incident on another reflection surface of the beam deflector 150. That is, as illustrated in the structure of the multibeam light source unit 200 explained referring to FIGS. 3 through 11, the first and second light sources 110a and 110B may be disposed in a row in the sub scanning direction, and the third and fourth light sources 110C and 110d may be disposed in a row in the sub scanning direction. In other words, the first through fourth light sources 110a through 110d are disposed in two rows and two columns on an identical plane. Accordingly, the first through the fourth multibeams L1 through L4 emitted from the first through the fourth light sources 110a through 110d travel in the same direction.

An incident optical system may be disposed on a beam path between the first through fourth light sources 110a through 110d and the beam deflector 150. The incident optical system may include collimator lenses 120a through 120d and cylindrical lenses 130ab and 130cd that are disposed on the beam paths of the first through fourth multibeams L1 through L4, respectively. The collimator lenses 120a through 120d are condensing lenses that make parallel beams or converging beams from the first through fourth multibeams L1 through L4 emitted from the first through fourth light sources 110a through 110d. The cylindrical lenses 130ab and 130cd may be anamorphic lenses that focus the first through fourth multibeams L1 through L4 in the direction corresponding to the sub scanning direction, and thus, form the first through fourth multibeams in an almost linear form on the reflection surface of the beam deflector 150. As the first and second light sources 110a and 110B are disposed closely in the sub scanning direction and the third and fourth light sources 110C and 110d are disposed closely in the sub scanning direction, one cylindrical lens 130ab may be shared for the first and second multibeams L1 and L2 and another cylindrical lens 130cd may be shared for the third and fourth multibeams L3 and L4. Cylindrical lenses 130ab and 130cd may be provided individually for each of the first through fourth multibeams L1 through L4. According to an embodiment, the collimator lenses 120a through 120d and the cylindrical lenses 130ab and 130cd may be replaced by an optical part for each beam path. On the beam path of each of the first through fourth multibeams L1 through L4, an aperture stop (not illustrated) may be provided. The aperture stop forms the luminous flux section (that is, diameter and shape) of the first through fourth multibeams L1 through L4.

The incident optical system may be an inclined optical system in which the first through fourth multibeams L1 through L4 emitted from the first through fourth light sources 110a through 110d are made to be incident, with inclination, on the reflection surface of the beam deflector 150. For example, as illustrated in FIG. 14, the first multibeam L1 may be incident, with inclination, on any one reflection surface of the beam deflector 150 with a predetermined incident angle ($\theta$) from an upper side, and the second multibeam L2 may also be incident, with inclination, on the same reflection surface of the beam deflector 150 with a predetermined incident angle ($\theta$) from a lower side. The incident angle ($\theta$) of the first and second multibeams L1 and L2 may be set, for example, in a range from two degrees to four degrees inclusive. In order to design an inclined optical system with this incident optical system, it may be necessary to densely dispose the first through fourth light sources 110a through 110d. As the first through fourth light sources 110a through 110d of the multibeam light source unit 200, described above with reference to FIGS. 3 through 11, can be densely disposed, the incident optical system of the light scanning unit 100 may be easily implemented as an inclined optical system, by employing the multibeam light source unit 200. By designing an incident optical system as an inclined optical system, cylindrical lenses 130ab and 130cd or first imaging lenses 161ab and 161cd may be shared, and thus the number of optical parts can be reduced to save material costs, and the light scanning unit 100 can be implemented in a smaller size.

On the beam path between the beam deflector 150 and the first through fourth scanning surfaces 180a through 180d, an imaging optical system may be disposed.

The imaging optical system forms images of the first through fourth multibeams L1 through L4 that are deflected and scanned in the beam deflector 150, on the outer circumference surface of the photo-sensitive drums 721 (illustrated in FIG. 20), that is, the first through fourth scanning surfaces 180a through 180d, respectively.

This imaging optical system may be formed with lenses having f$\theta$ characteristics for correcting the first through fourth multibeams L1 through L4, and thus the first through fourth multibeams L1 through L4 are scanned at a constant velocity on the first through fourth scanning surfaces 180a through 180d. For example, the imaging optical system may include first scanning lenses 161ab and 161cd and second scanning lenses 162a through 162d that are disposed on respective beam paths of the first through fourth multibeams L1 through L4. The first scanning lenses 161ab and 161cd may be designed to have almost zero (0) refractive power in the sub scanning direction and the second scanning lenses 162a through 162d may be designed to have a refractive power required in the sub scanning direction. The second scanning lenses 162a through 162d closest to a scanning surface may be eccentrically disposed, and thus a multibeam passes biased in the sub scanning direction with respect to an apex of the lens.

The light scanning unit 100 according to an embodiment may employ an inclined optical system, and thus the first scanning lens 160AB may be shared for the first and second multibeams L1 and L2 that are biased and scanned in parallel with an interval in a sub scanning direction. The other first scanning lens 160CD may be shared for the third and fourth multibeams L3 and L4 that are biased and scanned in a row with an interval in a sub scanning direction. By sharing the first lenses 161ab and 161cd, the number of optical parts may be reduced and the light scanning unit 100 may be implemented in a smaller size. A first scanning lens may be provided individually for each of the first through fourth multibeams L1 through L4. According to an exemplary embodiment, an imaging optical system may be formed with two scanning lenses for each beam path, but the optical system may be formed with one scanning lens for each beam path or three or more scanning lenses for each beam path.

A synchronization detection optical system (not illustrated) in which a synchronization signal of the first through fourth multibeams L1 through L4 biased and scanned in the beam deflector 150 is detected may be provided.

The first through fourth light sources 110a through 110d, the incident optical system, the beam deflector 150 and the imaging optical system are provided inside an optical housing 190 (illustrated in FIG. 3).

To implement the light scanning unit 100 in a smaller size, and to scan the first through fourth multibeams L1 through L4 in a predetermined direction in the light scanning unit 100, reflection units 171a through 171d and 172a through 172d may be provided. As the reflection units 171a through 171d and 172a through 172d, a mirror or a total reflection prism may be employed. The reflection units 171a through 171d and 172a through 172d are disposed between lenses of the imaging optical system or between the imaging optical system and the first through fourth scanning surfaces 180a through 180d, and thus a beam path may be changed appropriately. For example, each of the reflection units 171a through 171d may be disposed on the beam path of a corresponding one of the first through fourth multibeams L1 through L4 between the first scanning lenses 161ab and 161cd and the second scanning lenses 162a through 162d, and each of the other reflection units 172a through 172d may be disposed on the emitting side of a corresponding one of the second scanning lenses 162a through 162d. Thus, beam paths of the first through fourth multibeams L1 through L2 are changed twice and directed to the first through fourth scanning surfaces 180a through 180d.

Figure 15:
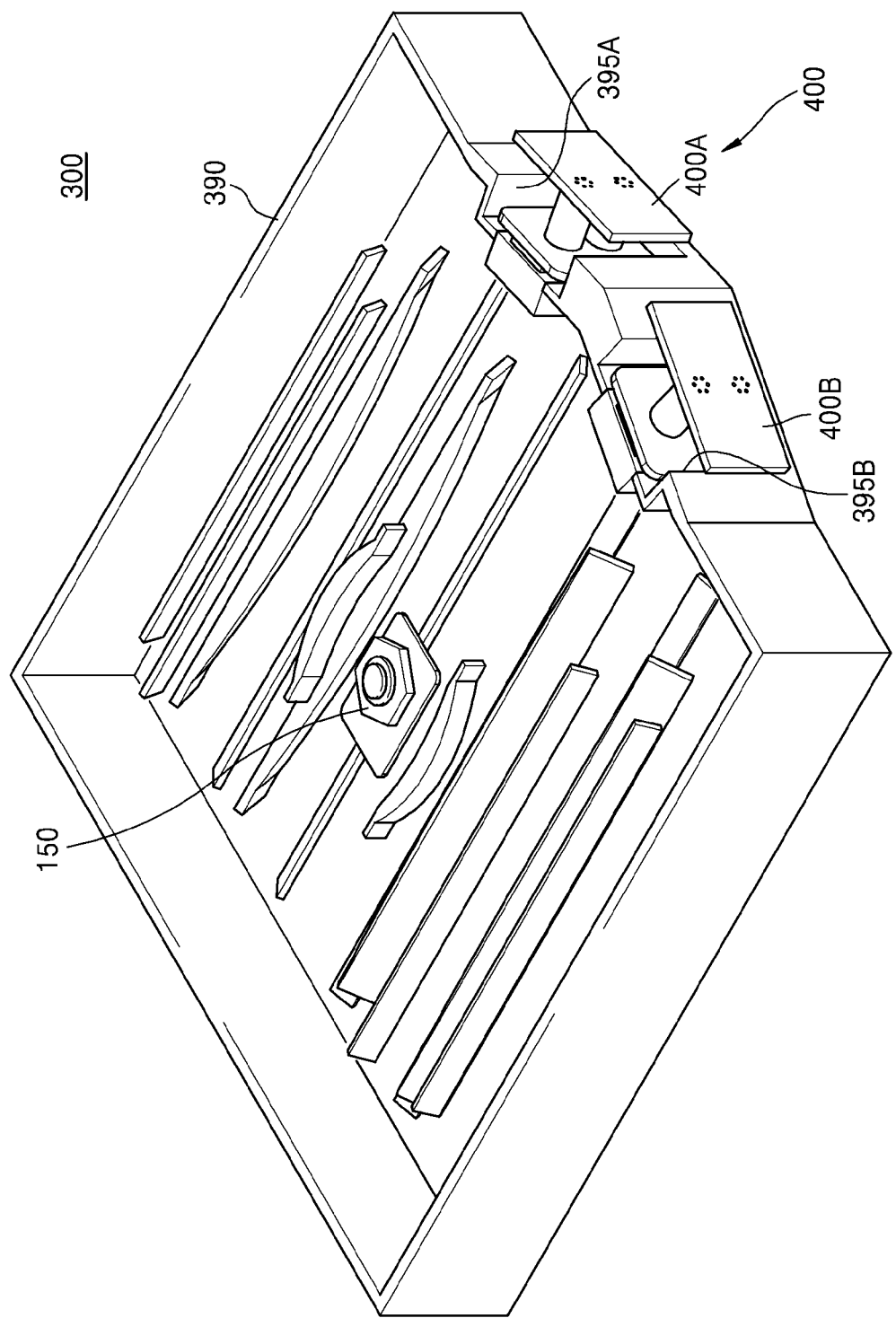
FIG. 15 is an optical housing of an optical scanning unit and a multibeam light source unit that is mounted on the optical housing according to an exemplary embodiment.

FIG. 15 is an optical housing 390 of an optical scanning unit 300 and a multibeam light source unit 400 that is mounted on the optical housing 390 according to an exemplary embodiment.

Referring to FIG. 15, the light scanning unit 300 according to an embodiment is a unit for scanning four multibeams, and may employ an inclined optical system described above with reference to FIGS. 12 through 14. The multibeam light source unit 400 may be disposed such that two multibeams are incident on any one reflection surface of a beam deflector 150, and the other two multibeams are incident on the other reflection surface of the beam deflector 150. For this, the multibeam light source unit 400 according to an embodiment includes a first sub light source unit 400A that emits two multibeams to any one reflection surface of the beam deflector 150, and a second sub light source unit 400B that emits two multibeams to the other reflection surface of the beam deflector 150. The first and second sub light source units 400A and 400B may be disposed such that the two multibeams emitted from the first sub light source unit 400A and the two multibeams emitted from the second sub light source unit 400B are in parallel or not in parallel. On one side of the optical housing 390, a first installation unit 395A and a second installation unit 395B on which the first and second sub light source units 400A and 400B are provided, respectively, are disposed, and thus four multibeams travel from one side of the optical housing 390.

Figure 16:
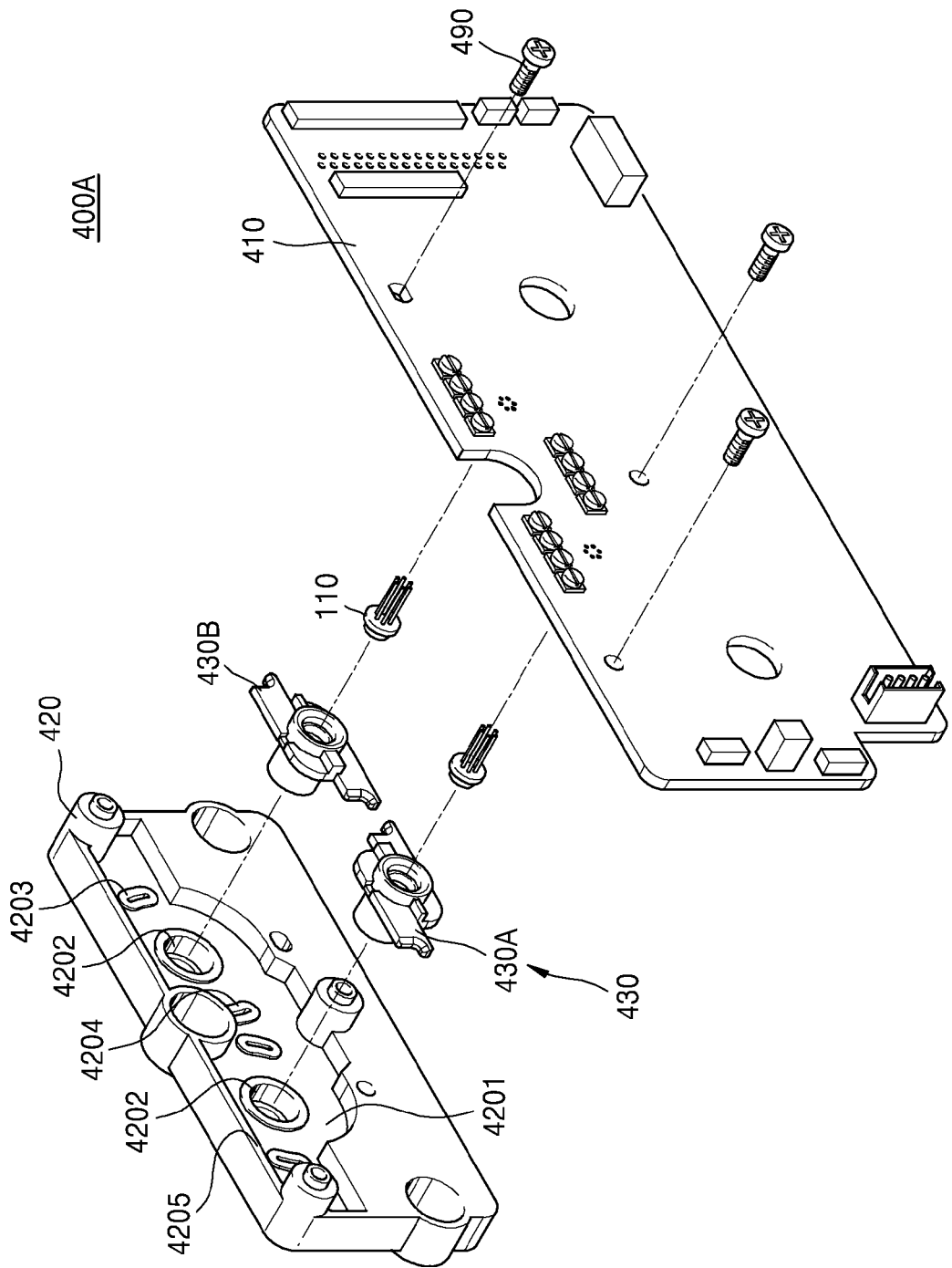
FIG. 16 is an exploded perspective view of an exemplary multibeam light source unit.
Figure 17:
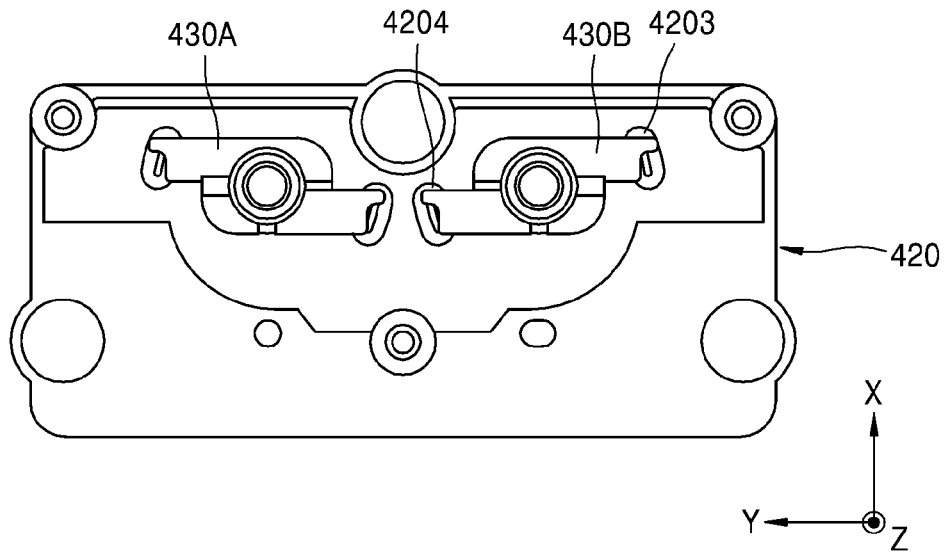
FIG. 17 illustrates an example in which a middle holder is coupled to a flange in a multibeam light source unit.

FIG. 16 is an exploded perspective view of the first sub light source unit 400A of the multibeam light source unit 400 illustrated in FIG. 15, and FIG. 17 illustrates an example of assembling a middle holder 430 and a flange 420 of the first sub light source unit 400A illustrated in FIG. 16.

Referring to FIG. 16, the first sub light source unit 400A includes two light sources 110, a circuit board 410 driving and controlling the two light sources 110, a flange 420, and two middle holders 430. The two light sources 110 are fixed to the two middle holders 430, respectively, and provided to the flange 420.

The flange 420 supports the middle holders 430 to which light sources are fixed, and thus the middle holders 430 can be adjusted by rotation. The flange 420 includes an installation surface 4201 on which the two middle holders are provided. On the installation surface 4201, two holder installation holes are provided. The middle holders 430 are inserted into the holder installation holes 4202, respectively. The two holder installation holes 4202 may be disposed with an interval in a sub scanning direction (y-axis direction). According to this arrangement of the two holder installation holes 4202, the two light sources 110 may emit two multibeams with an interval in the sub scanning direction (y-axis direction), and the two multibeams are made to be incident on any one reflection surface of the beam deflector 150 (illustrated in FIG. 15).

On the installation surface 4201 of the flange 420, a first fixing groove unit 4203 and a second fixing groove unit 4204 may be further provided in the vicinity of the two holder installation holes 4202, respectively.

The first and second fixing groove units 4203 and 4204 may be formed in a diagonal direction centering around the holder installation holes 4202, or in bilateral symmetry. In order to correspond to the adjustment of the middle holders 430 by rotation, the first and second fixing groove units 4203 and 4204 may be formed by being extended in an arc shape centering around the holder installation holes 4202. On the installation surface 4201 of the flange 420, two pairs of the first and second fixing groove units 4203 and 4204 may be disposed in bilateral symmetry.

Corresponding to the bilaterally symmetrical arrangement of the two pairs of the first and second fixing groove units 4203 and 4204 on the installation surface 4201 of the flange, similarly to the example illustrated in FIGS. and 5, the middle holders 430 may include a left middle holder 430A and a right middle holder 430B which are in bilateral symmetry. These middle holders 430 may be the middle holders 230 described above with reference to FIG. 7. The middle holders 430 may be one of the middle holders 231 through 235 of the embodiments described above with reference to FIGS. 8A through 8E.

The left middle holder 430A and the right middle holder 430B enable adjustment by rotation without interfering each other and can narrow the interval in the sub scanning direction (y-axis direction).

The flange 420 may include a side wall 4205 to be formed on the outside of the installation surface 4201, and thus a space in which the two middle holders 430 are accommodated. As illustrated in FIG. 15, the circuit board 410 is supported by the side wall 4205 and coupled with the flange 420 by screws 490.

The second sub light source unit 400B of the multibeam light source unit 400 may have a structure symmetric to that of the first sub light source unit 400A with respect to the main scanning direction (x-axis direction).

The multibeam light source units 200 and 400 according to an exemplary embodiment may have two or four light sources 100, but embodiments are not limited to this. For example, three or five or more light sources may be provided to one flange.

A method of adjusting a multibeam light source unit according to an embodiments disclosed.

Figure 18:
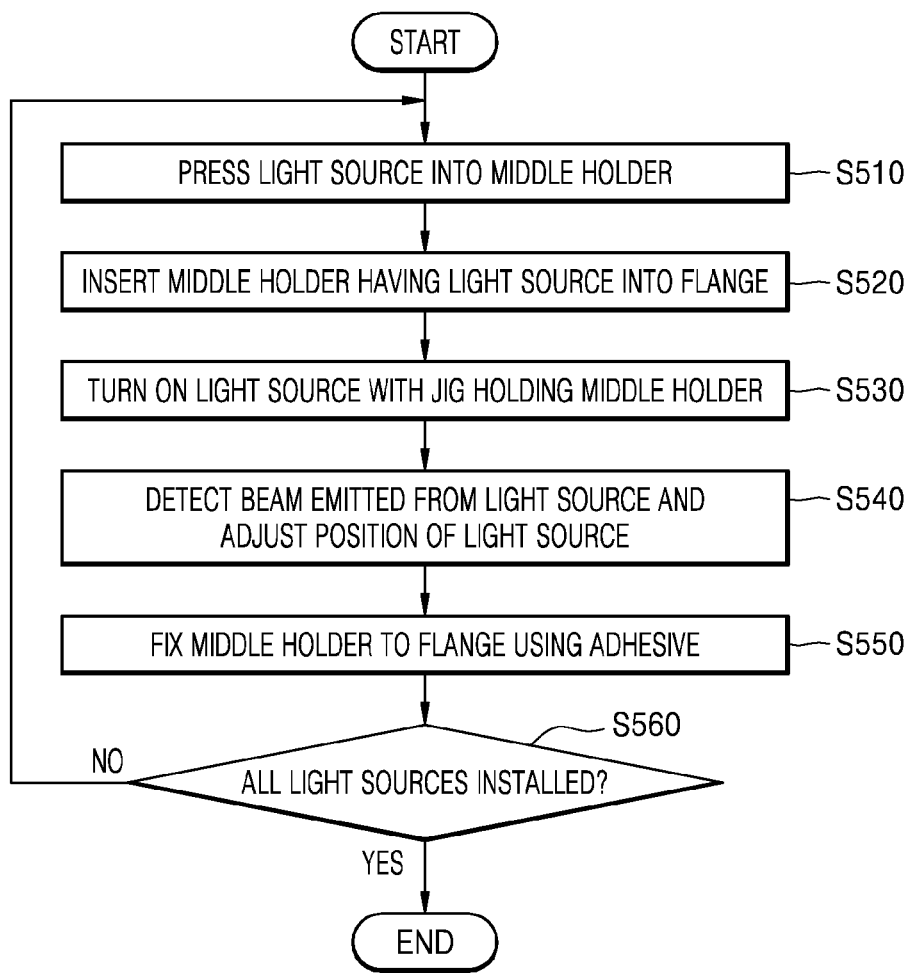
FIG. 18 is a flowchart illustrating a method of adjusting a multibeam light source unit according to an exemplary embodiment.

FIG. 18 is a flowchart explaining a method of adjusting a multibeam light source unit according to an exemplary embodiment, and FIGS. 19A through 19F are diagrams explaining exemplary operations of the method of adjusting a multibeam light source unit illustrated in FIG. 18.

According to an exemplary embodiment, adjustment and fixing of the multibeam light source unit (200 of FIG. 3, 400 of FIG. 15) may be performed first and then, the adjusted multibeam light source unit 200 and 400 is fixed to the optical housing 190 and 310 of the light scanning unit 100 and 300. The multibeam light source unit 200 explained above with reference to FIG. 3 through FIG. 7 is further explained as an example.

Referring to 19A and 19B, first, a light source 110 may be pressed into the cylinder type penetration hole 2301a of the insertion unit 2302 of the middle holder 230. As illustrated in FIG. 19C, a pressing-in unit 610 of a jig of adjusting equipment holds the first and second jig coupling units 2305 and 2306 of the middle holder 230, and inserts the insertion unit 2302 of the middle holder 230 into one of a plurality of holder installation holes 220 of the flange in operation S520. The first and second fixing protrusion units 2303 and 2304 on both sides of the middle holder 230 may be placed to be hung on top of a corresponding one of the first and second fixing groove units 2203 and 2204. As the shapes (for example, thicknesses) of the first and second jig coupling units 2305 and 2306 disposed on both sides of the middle holder 230 are different from each other, the left and right sides of the middle holder 230 are determined. Accordingly, the pressing-in unit 610 of the jig 600 inserts the middle holder 230 into the holder installation hole 2202 with the left and right sides of the middle holder 230 held in correction positions.

Figure 19D:
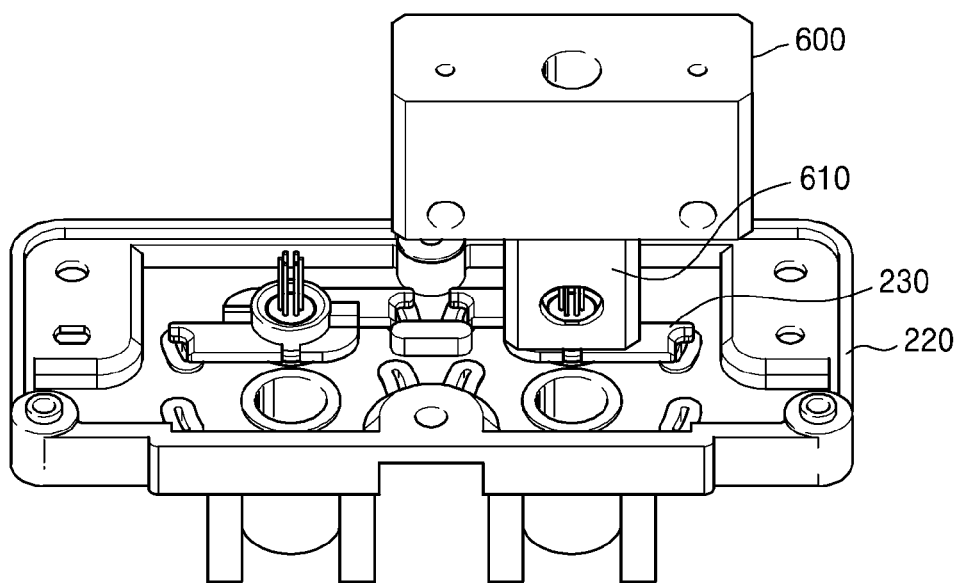

As illustrated in FIG. 19D, power may be provided to the light source 110 through the jig 600 in operation S530. With detecting the location and interval of a multibeam emitted from the light source 110, adjustment of at least one direction among upward, downward, left, right, and rotation directions may be performed in order for a multibeam to have predetermined position and interval in operation S540. A multibeam emitted from the light source 110 is formed with a plurality of light beams, and thus a plurality of scanning lines may be formed on a scanning surface at one scanning operation. Accordingly, if the light source 110 is rotated, the interval between beams of the multibeam in the sub scanning direction can be adjusted to a desired interval.

Figure 19E:
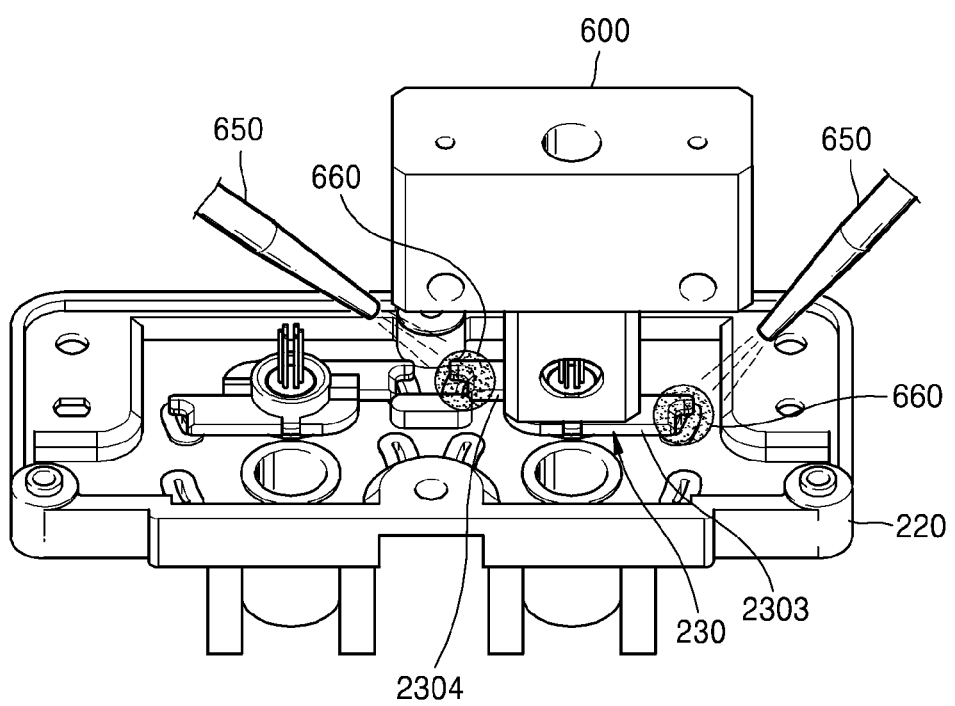
Figure 19F:
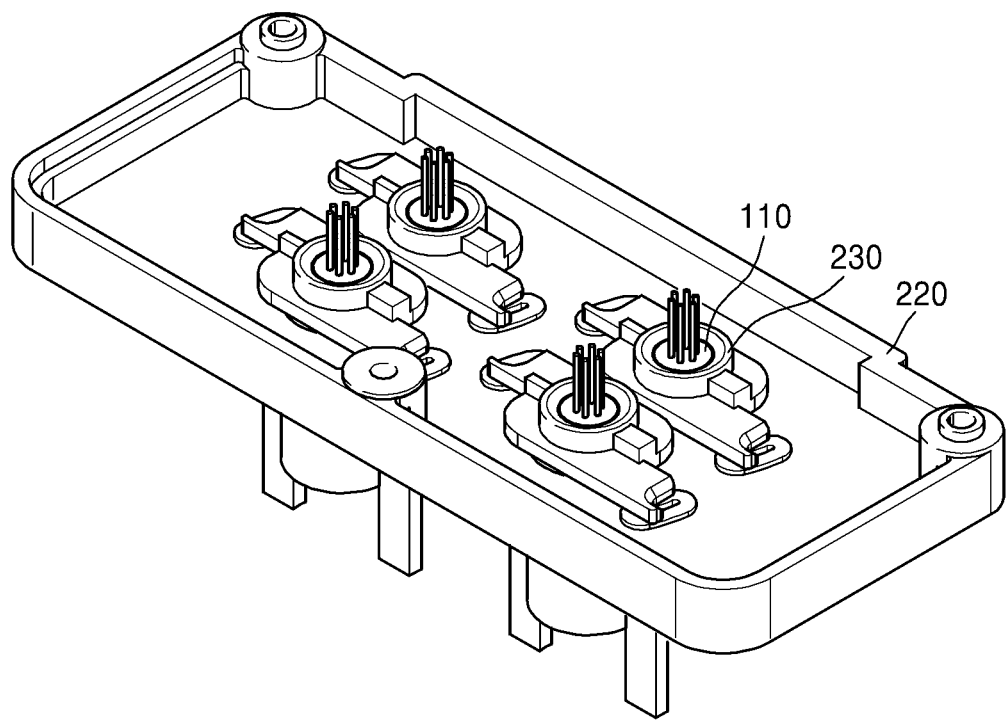

Referring to FIG. 19E, photopolymer adhesive 660 may be applied on and around the positions on top of the flange, corresponding to the first and second fixing protrusion units 2303 and 2304 having a wing shape and protruding on the left and right sides of the middle holder 230 of which position is adjusted. With an ultraviolet light source 650, ultraviolet beams may be applied to harden the photopolymer adhesive and fixe the middle holder 230 in operation S550. By fixing the middle holder 230 using the adhesive like this, the difference between before and after fixing is minimized. Also, easier assembly and less deviation is enabled.

The operations for adjusting the light source 110 described above with reference to FIGS. 19A through 19E, may be performed repeatedly until installation of all light sources 110 are completed in operation S560.

After the operations for adjusting the light source 110 are completed, an assembly process may be performed in which assembling of the multibeam light source unit 200 may be completed by attaching the flange 220 to the circuit board 210 and the multibeam light source unit 200 of which assembling is completed may be installed on the housing 190 of the light scanning unit 200.

According to an exemplary embodiment, an example in which the middle holders 230 into which the light sources 110 are pressed are installed one by one is explained, but embodiments are not limited to this. The middle holder 230 according to an embodiment enables minimizing the size of the middle holder 230 itself, and through simplification of the jig coupling unit (for example, the first and second jig coupling units 2305 and 2306 of FIG. 7), enables simultaneous adjustment of multiple middle holders 230. Thus, required working hours is reduced and material costs can be saved through miniaturization. When adjustment of a plurality of middle holder 230 is performed at the same time, operation S510 may be repeated for all light sources 110 and, operations S520 through S550 may be performed simultaneously for all middle holders 230.

According to an exemplary embodiment, an example in which photopolymer adhesive 660 is applied after adjusting the middle holder 230 is explained. However, according, for example, to convenience of operations, photopolymer adhesive 660 may be applied before adjusting the middle holder 230 (that is, before operation S530), and after the adjustment (that is, after operation S540), ultraviolet beams may be applied to harden the photopolymer adhesive 660 to fix the middle holder 230. According to an exemplary embodiment, photopolymer adhesive 660 is explained as an example, but adhesive such as thermosetting adhesive and super glue may also be employed.

Figure 20:
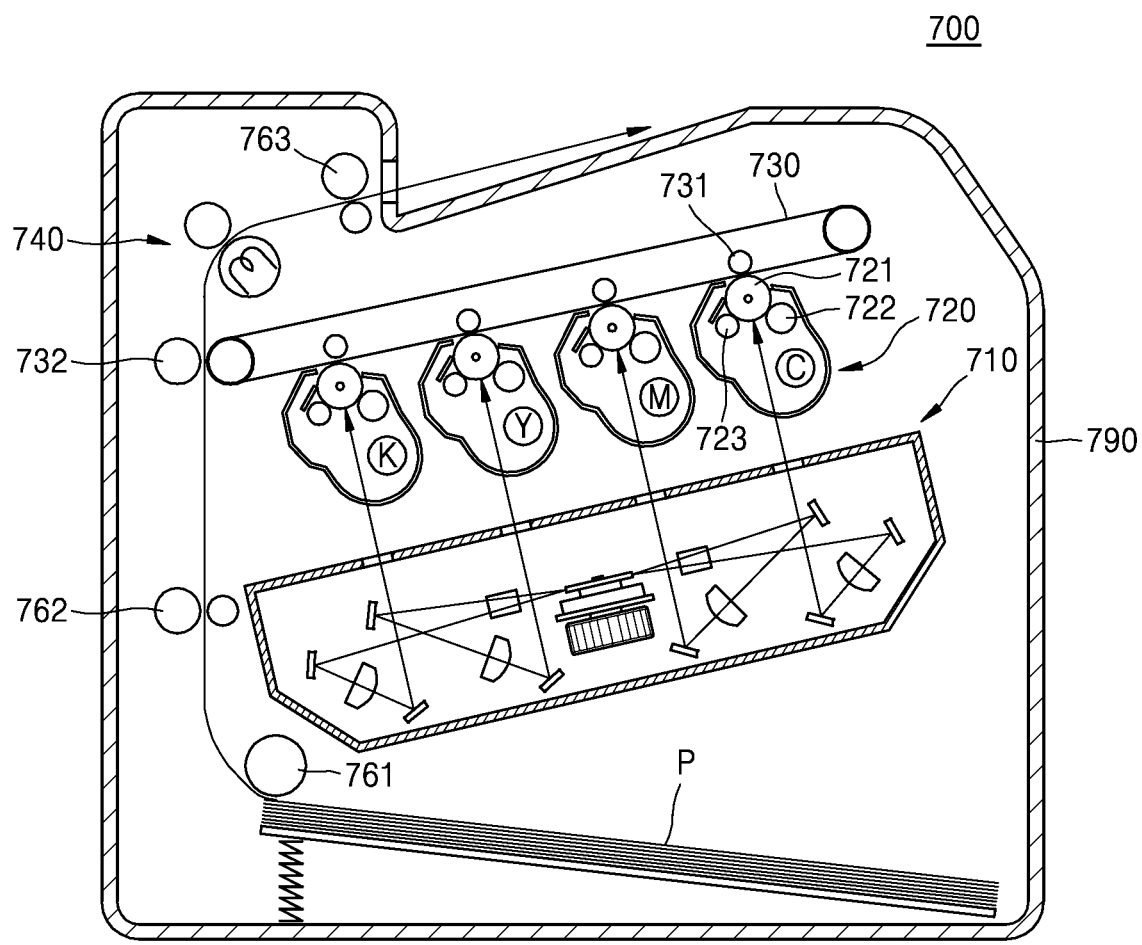
FIG. 20 is a diagram illustrating an electrophotography type image forming apparatus according to an exemplary embodiment.

FIG. 20 is a diagram illustrating an electrophotography type image forming apparatus 700 according to an exemplary embodiment. The image forming apparatus illustrated in FIG. 20 is a dry electrophotography type image forming apparatus which uses dry developer (hereinafter referred to as 'toner') and prints color images.

The image forming apparatus includes a light scanning unit 710, a developer unit 720, an intermediate transfer belt 730, a first transfer roller 731, a second transfer roller 732, and a fuser unit 740. These units are accommodated in a cabinet 790.

The light scanning unit 710 is a unit scanning a plurality of multibeams, and may be the light scanning units of the embodiments described above with reference to FIGS. 1 through 19F. For example, the light scanning unit 710 may scan four multibeams corresponding colors of black (K), magenta (M), yellow (Y), and cyan (C). As described above, as each of the first through fourth light beams L1 through L4 is a multibeam, a plurality of scanning lines may be formed on the first through fourth scanning surfaces 180a through 180d in one scanning operation, and thus, printing speed is enhanced.

The developer unit 720 may be provided for each color corresponding to a plurality of multibeams. For example, the developer unit 720 may be provided for each of the colors, black (K), magenta (M), yellow (Y), and cyan (C). The developer unit 720 includes a photosensitive drum 721 which is an image receiver on which electrostatic latent image is formed for each color, and developer roller 722 which develops the electrostatic latent images.

The photosensitive drum 721 is an example of a photoreceptor. In the photosensitive drum, a photosensitive layer with a predetermined thickness is formed on the outer circumference surface of a cylindrical metal pipe. The outer circumference surface of the photosensitive drum 721 is a scanning surface. The photosensitive drum 720 is exposed to the outside of the developer unit 720 and is disposed with a predetermined interval in the sub scanning direction. Instead of the photosensitive drum 721, a photosensitive belt having a belt shape may be employed as a photoreceptor.

A charging roller 723 is provided on the upstream side of a position that is exposed to light by the light scanning unit 710 on the outer circumference surface of the photosensitive drum. The charging roller 723 is an example of a charger that charges the surface of the photosensitive drum 721 to a uniform electric potential, with rotating in contact with the photosensitive drum 721. A charging bias is applied to the charging roller 723. A corona charger (not illustrated) may be used instead of the charging roller 723. The developer roller 722 provides toner to the photosensitive drum 721, by attaching toner on the outer circumference of the developer roller 722. A developing bias to provide the toner to the photosensitive drum 721 is applied to the developer roller 722. Though not illustrated in drawings, each of the developer unit 720 may further include a supplying roller that attaches toner, that is accommodated in the developer unit 720, to the developer roller 722, a control unit that controls the amount of toner attached to the developer roller 722, and an agitator (not illustrated) to deliver the toner accommodated in the developer unit 720, to the supplying roller and/or developer roller 722 side.

The intermediate transfer belt 730 faces the outer circumference surface of the photosensitive drum 721 exposed to the outside of the developer unit 720. The intermediate transfer belt 730 is an example of an intermediate transfer unit transferring the toner image of the photosensitive drum 71 to paper P. Instead of the intermediate transfer belt 730, an intermediate transfer drum may be employed as an intermediate transfer unit. The intermediate transfer belt 730 performs cyclic runs in contact with the photosensitive drum 721. Each of four first transfer rollers 731 is disposed to face a corresponding photosensitive drum 721 with the intermediate transfer belt 730 in between. A first transfer bias may be applied to the first transfer roller 731, and thus a toner image of the photosensitive drum 721 is transferred to the intermediate transfer belt 730.

A second transfer roller 732 may be disposed to face the intermediate transfer belt 730 such that paper P passes between them. A second transfer bias may be applied to the second transfer roller 732, and thus the toner image of the intermediate transfer belt 730 is transferred to the paper P.

A process for forming a color image is disclosed.

The photosensitive drum 721 of each developer unit 720 is charged to a uniform electric potential by the charging bias applied to the charge roller 723.

The light scanning unit 710 exposes to light, the scanning surface of the photosensitive drum 721 in the length direction, that is, the main scanning direction. As the photosensitive drum 721 rotates, the scanning surface moves to the sub scanning direction, and thus two-dimensional electrostatic latent images corresponding to image information of colors, black (K), magenta (M), yellow (Y), and cyan (C) are formed on the scanning surface of each of the four photosensitive drums 721, respectively. The sub scanning direction is a direction perpendicular to the main scanning direction. The four developer units 720 provide tones of respective colors, black (K), magenta (M), yellow (Y), and cyan (C), to the photosensitive drums 721, and thus, tone images of colors, black (K), magenta (M), yellow (Y), and cyan (C), are formed.

The toner images of colors, black (K), magenta (M), yellow (Y), and cyan (C), formed on the photosensitive drums 721, respectively, are transferred to the intermediate transfer belt 730 in an overlapping manner by the first transfer bias applied to the first transfer roller 731, and thus a color toner image is formed.

A medium that finally receives the toner, for example, the paper P, may be transferred by a pickup roller 761 and a transport roller 762, and guided into between the intermediate belt 720 and the second transfer roller 732.

The color toner image transferred to the intermediate transfer belt 730 may be transferred to the paper P by the second transfer bias applied to the second transfer roller 732. The color toner image transferred on the paper P may be kept on the surface of the paper P by electrostatic power. The paper P on which the color toner image is transferred is sent to the fuser unit 740. The color toner image transferred on the paper P receives heat and pressure in the fusing nip of the fuser unit 740, and fused to the paper P. The paper P on which fusing is completed is discharged to the outside of the image forming apparatus by a discharge roller 763.

The image forming apparatus is explained with an example of forming a color image, but embodiments are not limited to this. For example, when an image of a monochrome of black and white is formed, the light scanning unit 710 may scan one multibeam and the developer unit 720 may be provided for only one multibeam. The elements of the image forming apparatus, except the image scanning unit 100, that is, the developer unit 720, the intermediate transfer belt 730, the first and second transfer rollers 731 and 732, the fuser unit 740, are explained as an example of printing unit that transfers a toner image onto a printing medium in an electrophotography method. Various types of printing units may be applied to the image forming apparatus according to the embodiments.

The multibeam light source unit, the method of adjusting the unit, the light scanning unit, and the electrophotography type image forming apparatus are explained above with reference to the embodiments illustrated on the drawings in order to help understanding. While one or more embodiments have been described with reference to the figures, it will be understood by those of ordinary skill in the art that various changes in form and details may be made therein without departing from the spirit and scope of the present invention as defined by the following claims.

What is claimed is:
1. A multibeam light source unit comprising:
a plurality of light sources that emit a multibeam, respectively;
a flange that has an installation surface on which a plurality of holder installation holes are provided; and
a plurality of middle holders on each of which a corresponding one of the plurality of light sources is provided,
wherein each of the plurality of the middle holders comprises:
a light source mounting unit on which one of the plurality of the light sources is provided,
a cylinder-shape insertion unit that is inserted into one of the plurality of the holder installation holes, a first fixing protrusion unit and a second fixing protrusion unit, each of which is protruding outside from the light source mounting unit and is fixed to the flange by adhesive, and a jig coupling unit that is coupled with a jig when adjustment is performed, wherein in each of the first and second fixing protrusion units, part of an end is removed or a penetration hole is formed at the end.

2. The multibeam light source unit of claim 1, wherein the plurality of holder installation holes are disposed in rows and columns in a main scanning direction and in a sub scanning direction, respectively.

3. The multibeam light source unit of claim 2, wherein the plurality of holder installation holes are four holder installation holes and the four holder installation holes are disposed in two rows and two columns in a main scanning direction and in a sub scanning direction, respectively.

4. The multibeam light source unit of claim 1, wherein the plurality of holder installation holes are two holder installation holes and the two holder installation holes are disposed with an interval in a sub scanning direction.

5. The multibeam light source unit of claim 1, wherein the flange comprise a first fixing groove unit and a second fixing groove unit concavely formed in the vicinity of each of the plurality of holder installation holes.

6. The multibeam light source unit of claim 5, wherein the first and second fixing groove units are formed by being extended in an arc shape centering around a corresponding one of the plurality of holder installation holes.

7. The multibeam light source unit of claim 5, wherein the first and second fixing groove units are formed at positions to be in contact with a first fixing protrusion unit and a second fixing protrusion unit, respectively, of the plurality of the middle holders.

8. The multibeam light source unit of claim 5, wherein the plurality of holder installation holes and the first and second fixing groove units are formed in bilateral symmetry or rotational symmetry on the installation surface of the flange.

9. The multibeam light source unit of claim 1, wherein the flange is formed of plastic resin.

10. The multibeam light source unit of claim 1, wherein the light source mounting unit comprises a penetration hole into which the light source is pressed in, and the penetration hole penetrates to the end of the insertion unit.

11. The multibeam light source unit of claim 1, wherein the outer circumference surface of the light source mounting unit is formed in a canted column shape, and the canted column shape of the light source mounting unit performs as a jig coupling unit.

12. The multibeam light source unit of claim 1, wherein the first and second fixing protrusion units are disposed in bilateral symmetry or rotational symmetry with respect to the light source mounting unit.

13. The multibeam light source unit of claim 1, wherein the plurality of middle holders are fixed to the flange with photopolymer adhesive.

14. The multibeam light source unit of claim 1, wherein each of the first and second jig coupling units has a protrusion shape protruding from circumference of the light source mounting unit.

15. The multibeam light source unit of claim 14, wherein the first and second jig coupling units have shapes different from each other.

16. The multibeam light source unit of claim 1, wherein each of the first and second jig coupling units has a concave groove shape concavely formed in circumference of the light source mounting unit.

17. The multibeam light source unit of claim 1, wherein the first and second jig coupling units are disposed in bilateral symmetry or rotational symmetry with respect to the light source mounting unit.

18. The multibeam light source unit of claim 1, wherein the plurality of middle holders are made of metal or plastic resin.

19. The multibeam light source unit of claim 1, further comprising a circuit board that is provided on the installation surface of the flange, and drives and controls the plurality of light sources.

20. The multibeam light source unit of claim 19, wherein the plurality of middle holders are disposed between the flange and the circuit board.

21. The multibeam light source unit of claim 20, wherein the flange comprises a side wall disposed outside of the installation surface to provide a space that accommodates the plurality of middle holders, and the circuit board is supported by the side wall.

22. The multibeam light source unit of claim 1, wherein the plurality of light sources are multibeam laser diodes.

23. A light scanning unit comprising:

a multibeam light source unit;

a beam deflector that deflects and scans a plurality of multibeams emitted from the multibeam light source unit;

an incident optical system that makes the plurality of multibeams emitted from the multibeam light source unit, incident on the beam deflector; and an imaging optical system that enables the multibeam deflected by the beam deflector, to form an image on a scanning surface, wherein the multibeam light source unit comprises:

a plurality of light sources that emit multibeam, respectively, a flange that has an installation surface on that a plurality of holder installation holes are provided, and a plurality of middle holders on each of which a corresponding one of the plurality of light sources is provided, wherein each of the plurality of the middle holders comprises:

a light source mounting unit on which one of the plurality of the light sources is provided, a cylinder-shape insertion unit which is inserted into one of the plurality of the holder installation holes, a first fixing protrusion unit and a second fixing protrusion unit, each of which is protruding outside from the light source mounting unit and is fixed to the flange by adhesive, and a jig coupling unit that is coupled with a jig when adjustment is performed, wherein in each of the first and second fixing protrusion units, part of an end is removed or a penetration hole is formed at the end.

24. The light scanning unit of claim 23, wherein the incident optical system is an inclined optical system that enables at least two multibeams among the plurality of multibeams, to be incident, with inclination, on one reflection surface of the beam deflector.

25. An electrophotography type image forming apparatus comprising:
- a light scanning unit that comprises:
  - a multibeam light source unit; a beam deflector that deflects and scans a plurality of multibeams emitted from the multibeam light source unit,
  - an incident optical system that makes the plurality of multibeams emitted from the multibeam light source unit, incident on the beam deflector, and
  - an imaging optical system that enables the multibeam deflected by the beam deflector, to form an image on a scanning surface;
- a developer unit that comprises:
  - a plurality of photoreceptors each of which is disposed where an image of a corresponding one of the plurality of multibeams emitted from the light scanning unit is formed, and on which an electrostatic latent image is formed, and
  - a developer roller that develops the electrostatic latent images formed on the plurality of photoreceptor; and
- a transfer unit onto which the image developed by the developer unit is transferred,
- wherein the multibeam light source unit comprises:
  - a plurality of light sources that emit multibeam, respectively;
  - a flange that has an installation surface on which a plurality of holder installation holes are provided; and
  - a plurality of middle holders on each of which a corresponding one of the plurality of light sources is provided,
- wherein each of the plurality of the middle holders comprises:
  - a light source mounting unit on which one of the plurality of the light sources is provided,
  - a cylinder-shape insertion unit that is inserted into one of the plurality of the holder installation holes,
  - a first fixing protrusion unit and a second fixing protrusion unit, each of which is protruding outside from the light source mounting unit and is fixed to the flange by adhesive; and a jig coupling unit that is coupled with a jig when adjustment is performed,
- wherein in each of the first and second fixing protrusion units, part of an end is removed or a penetration hole is formed at the end.

26. A light source unit comprising:
- a plurality of light sources;
- a flange that has a surface on which a plurality of holder installation holes are provided; and
- a plurality of holders to respectively hold a corresponding one of the plurality of light sources,
- wherein each of the plurality of the holders comprises:
- a light source mounting unit on which one of the plurality of the light sources is provided,
- an insertion unit that is inserted into one of the plurality of the holder installation holes,
- a first fixing protrusion unit and a second fixing protrusion unit, each of which is protruding outside the light source mounting unit and fixed to the flange, and
- a jig coupling unit that is coupled with a jig when adjustment is performed,
- wherein in each of the first and second fixing protrusion units, part of an end is removed or a penetration hole is formed at the end.

* * * * *